United States Patent
Granig

(10) Patent No.: US 12,031,846 B2
(45) Date of Patent: Jul. 9, 2024

(54) GENERATION OF AN OUTPUT SIGNAL VALUE FROM SENSOR SIGNAL VALUES OF AT LEAST THREE REDUNDANT SENSORS

(71) Applicant: Infineon Technologies AG, Neubiberg (DE)

(72) Inventor: Wolfgang Granig, Seeboden (AT)

(73) Assignee: Infineon Technologies AG, Neubiberg (DE)

( * ) Notice: Subject to any disclaimer, the term of this patent is extended or adjusted under 35 U.S.C. 154(b) by 380 days.

(21) Appl. No.: 16/901,562

(22) Filed: Jun. 15, 2020

(65) Prior Publication Data

US 2020/0408564 A1 Dec. 31, 2020

(30) Foreign Application Priority Data

Jun. 26, 2019 (DE) .......................... 102019209293.4

(51) Int. Cl.
*G01D 1/04* (2006.01)
*G01D 5/00* (2006.01)

(52) U.S. Cl.
CPC ................ *G01D 1/04* (2013.01); *G01D 5/00* (2013.01)

(58) Field of Classification Search
CPC ........ G01D 1/04; G01D 5/00; G01D 5/24466; G01D 5/145; G01D 18/00; G01D 15/00; G01D 3/0365; G01D 3/08; G05D 1/007; G01C 23/00; G05B 9/03; G01R 33/06
See application file for complete search history.

(56) References Cited

U.S. PATENT DOCUMENTS

| 4,327,437 | A | | 4/1982 | Frosch et al. |
| 4,472,806 | A | | 9/1984 | Blair |
| 4,517,639 | A | | 5/1985 | Ferrell et al. |
| 5,222,065 | A | | 6/1993 | Krogmann |
| 5,663,899 | A | * | 9/1997 | Zvonar ................ G01K 15/00 236/15 BB |
| 6,073,262 | A | * | 6/2000 | Larkin .................... G05B 9/03 714/736 |
| 2004/0078715 | A1 | | 4/2004 | Vth |

(Continued)

FOREIGN PATENT DOCUMENTS

| CN | 102914360 | * | 2/2013 |
| DE | 102 50 321 A1 | | 6/2003 |

(Continued)

OTHER PUBLICATIONS

Kasinathan, An Artificial Neural Network Approach for the Discordance Sensor Data Validation for SCRAM Parameters (Year: 2009).*

(Continued)

*Primary Examiner* — Mohamed Charioui
*Assistant Examiner* — Dacthang P Ngo
(74) *Attorney, Agent, or Firm* — Harrity & Harrity, LLP

(57) ABSTRACT

A device for the generation of an output signal value making use of sensor signal values of at least three redundant sensors comprises a computing device that is configured to calculate absolute magnitudes of the differences between all possible pairs of the sensor signal values, and to determine the output signal value taking the calculated absolute magnitudes into consideration.

21 Claims, 15 Drawing Sheets

(56) References Cited

U.S. PATENT DOCUMENTS

| | | | |
|---|---|---|---|
| 2015/0233730 A1* | 8/2015 | Guillet | G01C 23/00 701/3 |
| 2016/0109557 A1* | 4/2016 | Soohoo | G01S 5/06 367/118 |
| 2020/0133250 A1* | 4/2020 | Gaydos | G06F 17/18 |

FOREIGN PATENT DOCUMENTS

| | | |
|---|---|---|
| EP | 0307191 A2 | 3/1989 |
| EP | 0416370 A2 | 3/1991 |
| EP | 2098959 A2 | 9/2009 |
| EP | 2413208 A1 | 2/2012 |
| EP | 2759936 A1 | 7/2014 |
| GB | 2278697 A | 12/1994 |
| WO | 84/00071 A1 | 1/1984 |
| WO | 2005/114419 A2 | 12/2005 |
| WO | 2017/103093 A1 | 6/2017 |
| WO | 2017/203975 A1 | 11/2017 |
| WO | 2018/066124 A1 | 4/2018 |

OTHER PUBLICATIONS

Granig, Diagnostic Coverage Estimation Method for Optimization of Redundant Sensor System (Year: 2017).*
CN102914360 translation (Year: 2013).*

* cited by examiner

GENERATION OF AN OUTPUT SIGNAL VALUE FROM SENSOR SIGNAL VALUES OF AT LEAST THREE REDUNDANT SENSORS

CROSS REFERENCE TO RELATED APPLICATION

This application claims priority to German Patent Application No. 102019209293.4 filed on Jun. 26, 2019, the content of which is incorporated by reference herein in its entirety.

TECHNICAL FIELD

The present disclosure discloses devices and methods for the generation of an output signal value from sensor signal values of at least three redundant sensors.

BACKGROUND

It is frequently necessary to acquire state variables with high reliability. Sensors can be provided for the acquisition of the state variables, for example temperature sensors for the acquisition of a temperature, or magnetic field sensors for the acquisition of a magnetic field or a magnetic field direction, in order to deduce a position or a speed of rotation from the acquired magnetic field or the acquired magnetic field direction. In order to achieve a high reliability, the provision of redundant sensors that are designed to acquire the same state variable is known.

In many technical fields, for example the automobile industry, safety requirements for electrical and electronic systems must be met, which necessitates the implementation of additional functions in order to record faults. These additional functions are sometimes referred to as safety mechanisms that are developed and implemented in order to record a fault of a power supply, of an oscillator, of a memory, of controllers etc. For integrated sensor systems, a redundancy of sensors is a powerful method for fault recording.

The implementation of multiple instances of sensor channels to enable redundant functionalities is known. Such redundant systems can be implemented in various ways; FIG. 11 shows possible redundant systems. Two sensor chips 12 are arranged next to one another in a housing 14 in a redundant system 10. Two sensor chips 12 are arranged one over the other in a housing 14 in a redundant system 20. Two sensor chips 12 are arranged one over the other in a housing 14 in a redundant system 30, wherein a lead frame 32 is arranged between the sensor chips 12. Each sensor chip 12 can comprise one respective sensor. Two sensors are arranged in one sensor chip 42 in a redundant system 40.

The redundant systems shown in FIG. 11 each comprise two sensors that provide sensor signals on two sensor channels. FIG. 12 shows an input variable x to be measured, which can be a state variable that is to be acquired. A first sensor of the redundant system supplies a first sensor signal on a first sensor channel 50, and a second sensor of the redundant system supplies a second sensor signal on a second sensor channel 52. At any one time, the sensor signals have respective sensor signal values X1, X2. A first computing apparatus 54 is provided to perform an output function in order to calculate a sensor output signal Z on the basis of the first and second sensor signal values X1 and X2. A second computing apparatus 56 is provided to perform a diagnostic function on the basis of the first and second sensor signal values in order to provide a diagnostic output signal D.

For example, the redundant channels that are supplied by the two sensors are used as a safety mechanism in order to provide the diagnostic output signal as follows:

$$Z = X1$$
$$dX12 = X1 - X2$$
$$D = \begin{cases} 1, |dX12| \geq dsml \\ 0, |dX12| < dsml \end{cases}$$

dsml here represents a threshold value with which the absolute magnitude of the difference dX12 between the two sensor signal values X1 and X2 is compared. If the absolute magnitude exceeds the threshold value dsml, the diagnostic output signal indicates a fault and can, for example, have a value of 1. If the absolute magnitude is smaller than the threshold value, the diagnostic output signal does not indicate a fault and can, for example, have a value of 0. The diagnostic output signal can, for example, be provided through 1 bit.

The redundant channels can also be used as follows to calculate the sensor output signal Z as the mean value between the two sensor signal values X1, X2:

$$Z = \frac{X1 + X2}{2}$$

Further sensor channels can be added to increase the reliability.

OVERVIEW

Devices and methods that make it possible to combine output signals from three or more redundant sensor channels in an appropriate manner in order to obtain a reliable output acquisition signal are described herein.

Examples of the present disclosure create a device for the generation of an output signal value making use of sensor signal values of at least three redundant sensors, with a computing device that is configured to calculate absolute magnitudes of the differences between all possible pairs of the sensor signal values, and to determine the output signal value taking the calculated absolute magnitudes into consideration.

Examples of the present disclosure create a method for the generation of an output signal value making use of sensor signal values of at least three redundant sensors, wherein absolute magnitudes of the differences between all possible pairs of the sensor signal values are calculated, and the output signal value is determined taking the calculated absolute magnitudes into consideration.

Examples of the present disclosure create a device for the generation of an output signal value making use of sensor signal values of at least three redundant sensors, with a computing device that is configured: to determine a deviation between the sensor signal value and a mean value of all the other sensor signal values for each sensor signal value; to determine the sensor signal value for which the largest deviation has been ascertained; and to determine the output signal value, wherein the sensor signal value for which the largest deviation was ascertained is not taken into consideration in the determination of the output signal value.

Examples of the present disclosure create a method for the generation of an output signal value making use of sensor signal values of at least three redundant sensors, with the following features: ascertaining a deviation between the sensor signal value and a mean value of all the other sensor signal values for each sensor signal value; determination of the sensor signal value for which the greatest deviation has been ascertained; and determination of the output signal value, wherein the sensor signal value for which the largest deviation has been ascertained is not taken into consideration in the determination of the output signal value.

Examples of the present disclosure create a methodology that makes it possible to combine all the redundant sensor channels when using more than two sensor channels for a reliable output acquisition signal. Examples further enable a reliable acquisition of faults and a consistent fault reaction without large signal jumps.

BRIEF DESCRIPTION OF THE DRAWINGS

Examples of the present disclosure are described below, making reference to the appended drawings. Here.

DETAILED DESCRIPTION

Examples of the present disclosure are described below in detail, making use of the appended drawings. It is to be noted that the same elements, or elements that have the same functionality, can be given the same or similar reference signs, while a repeated description of elements that are given the same or a similar reference sign is typically omitted. Descriptions of elements that have the same or similar reference signs are interchangeable. In the following description, many details are described in order to provide a more thorough explanation of examples of the disclosure. For experts it is however obvious that other examples can be implemented without the specific details. Features of the different examples described can be combined with one another unless features of a corresponding combination are mutually exclusive, or such a combination is explicitly excluded.

Figure 1:
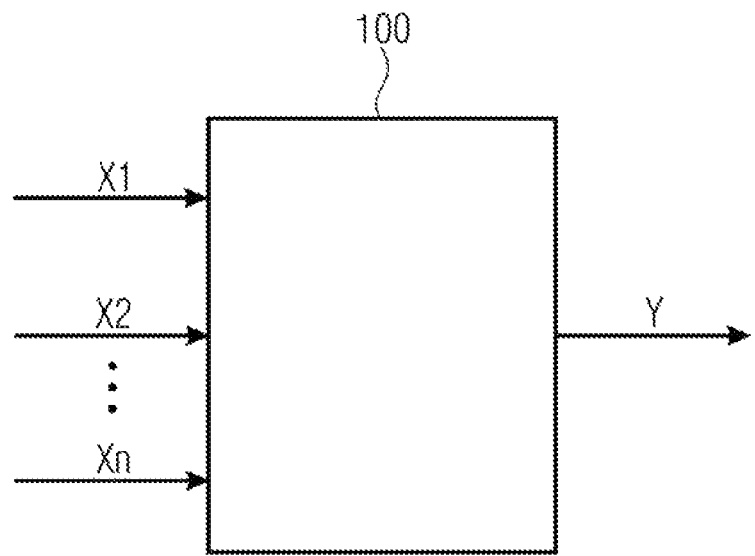
FIG. 1 shows a schematic illustration of a device according to one example of the present disclosure.
Figure 11:
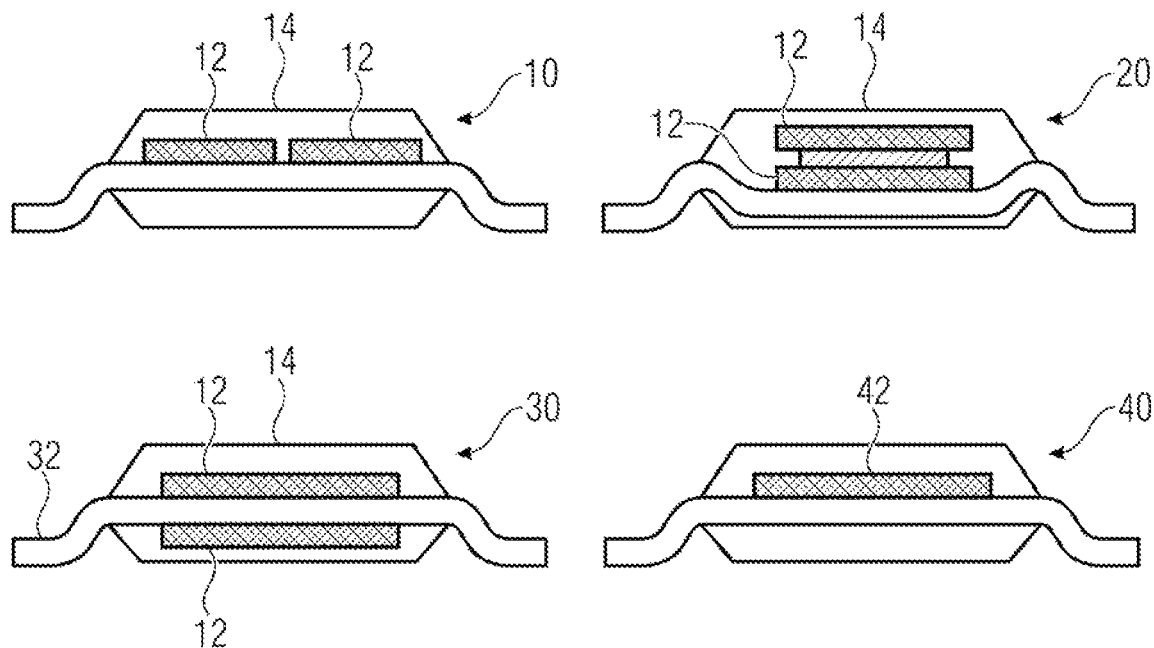
FIG. 11 shows examples of redundant sensor systems.
Figure 12:
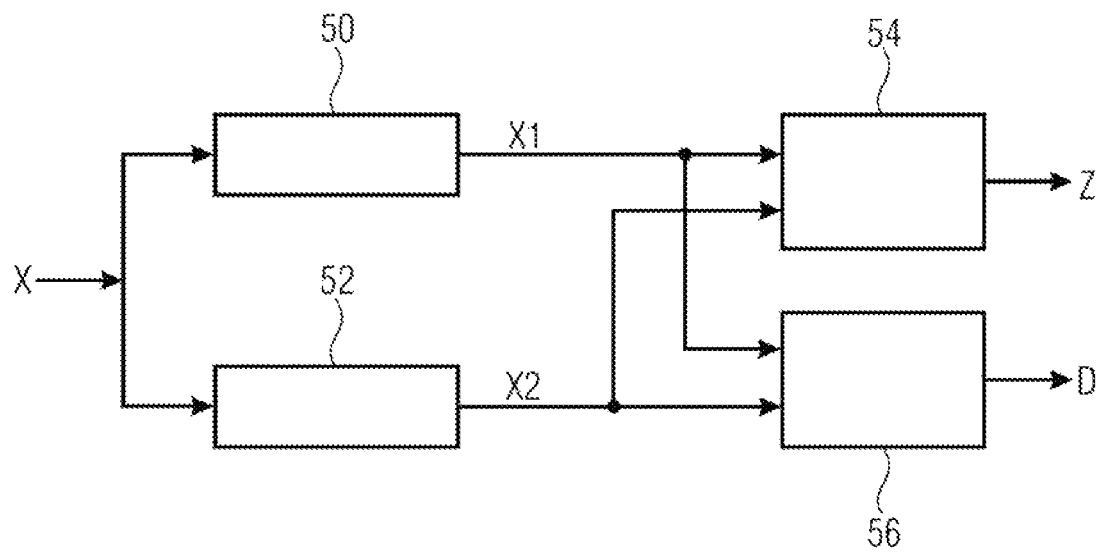
FIG. 12 shows a schematic illustration of a device for the evaluation of two sensor channels of a redundant sensor system.

FIG. 1 shows schematically a device 100 for the generation of an output signal value Y making use of n sensor signal values X1, X2, Xn, where n is a natural number ≥3. The sensor signal values originate from redundant sensors that can for example be provided on one or a plurality of chips, similarly to how this was explained above for two redundant sensors with reference to FIG. 11. At least three redundant sensors are however provided, whose sensor signals or sensor signal values can be processed as described below in order to generate the output signal value Y.

Figure 2:
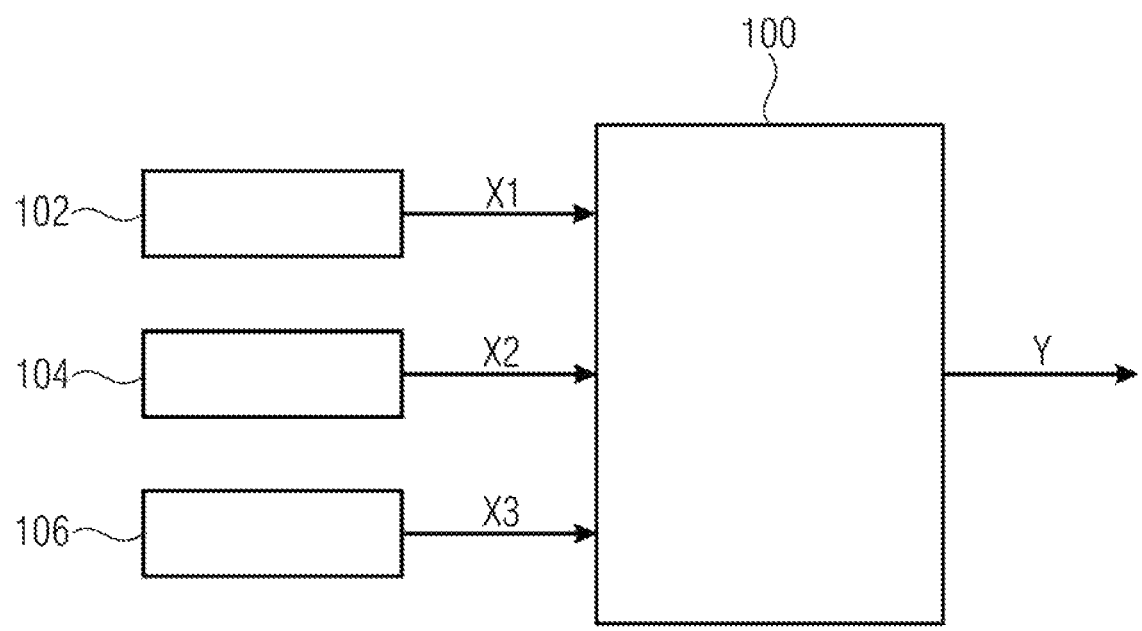
FIG. 2 shows a schematic illustration of an example of a sensor system according to the present disclosure.

FIG. 2 shows schematically an example of a sensor system with three redundant sensors 102, 104 and 106, and a device 100 for the generation of the output signal value Y from the sensor signal values X1, X2 and X3 of the three sensors 102, 104 and 106. It is clear that a different number of redundant sensors can be provided in other examples. In particular, the methodology described here is applicable without difficulty to sensor systems with a number of redundant sensors greater than three.

Figure 3:
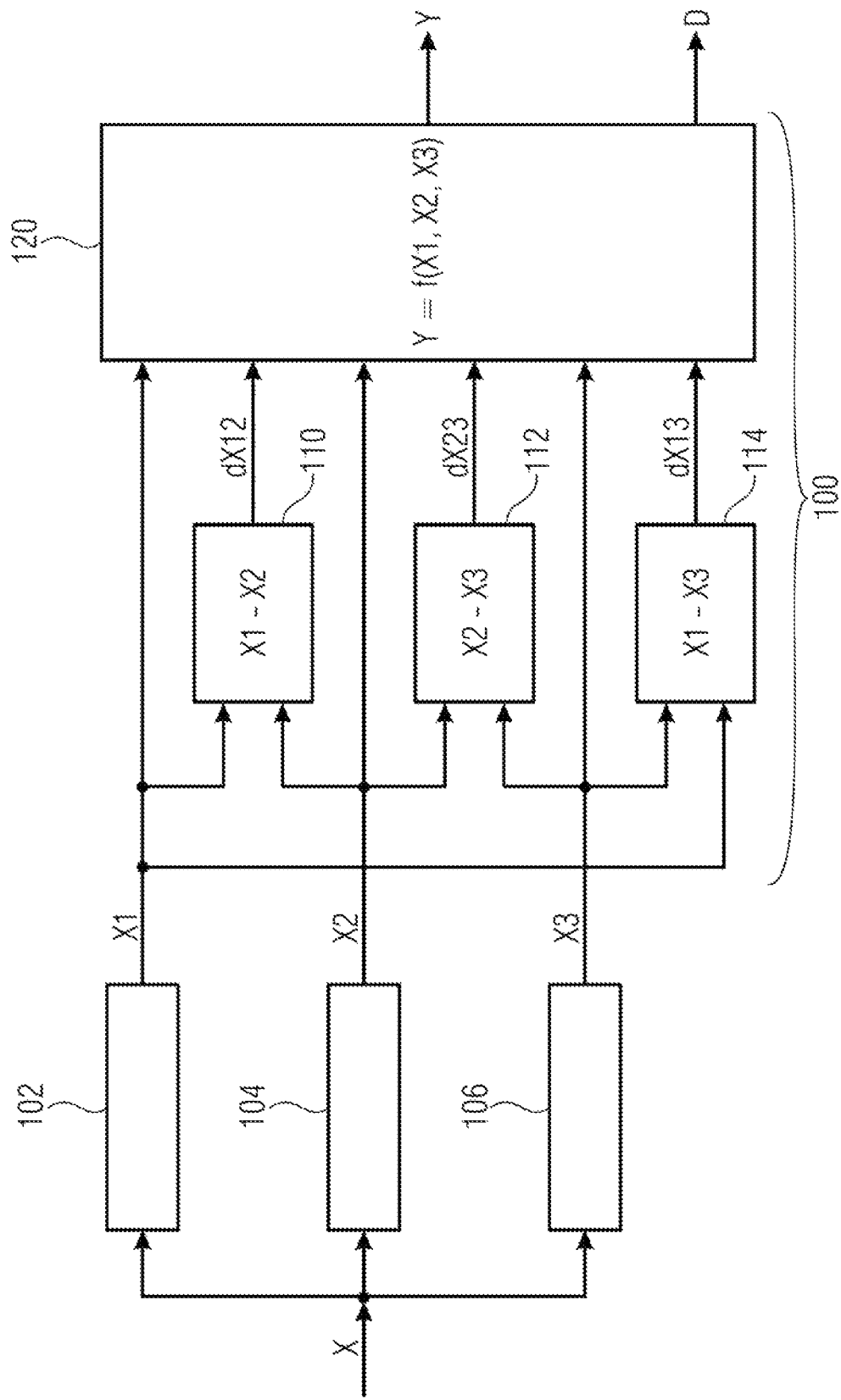
FIG. 3 shows a schematic illustration of an example of a redundant sensor system with three channels.

FIG. 3 shows schematically an illustration of an example of a redundant sensor system with three sensors or sensor channels 102, 104 and 106. The sensors 102, 104 and 106 are designed to acquire a state variable x, for example a magnetic field strength, a magnetic field direction, or a temperature. The sensors are redundant in the sense that in the ideal case they deliver the same sensor signal values X1, X2 and X3 on the basis of the same state variable. The computing device 100 is designed to calculate absolute magnitudes of differences between all possible pairs of the sensor signal values X1, X2 and X3. In the example with three sensors shown, there are three corresponding pairs, of which a first pair comprises the sensors 102 and 104, a second pair the sensors 104 and 106 and a third pair the sensors 102 and 106. The computing device 100 is accordingly designed to calculate the absolute magnitude dX12 of the difference between the sensor signal values X1 and X2, block 110, to calculate the absolute magnitude dX23 of the difference between the sensor signal values X2 and X3, block 112, and to calculate the absolute magnitude dX13 of the difference between the sensor signal values X1 and X3, block 114.

A block 120 receives the absolute magnitudes dX12, dX23 and dX13 and, taking these into consideration, determines an output signal value Y. The block 120 can, furthermore, receive the sensor signal values X1, X2 and X3 in order, making use of these, to generate a diagnostic output signal D.

Different aspects related to the determination of the output signal value taking the sensor signal values of a plurality of at least three redundant sensors into consideration are described below in more detail.

Aspect 1

In examples according to an aspect 1, a procedure can be used to generate the output signal differences wherein, if a deviation between two channels exceeds a specified threshold value, a fault reaction is initiated in order to reduce or remove this fault in a faulty channel. The threshold value here can be a specified threshold of a safety mechanism.

In examples, the computing device according to the aspect 1 is configured to compare each of the ascertained absolute magnitudes with a threshold value in order to check for each sensor signal value whether the absolute magnitudes calculated making use of this sensor signal value exceed the threshold value. The sensor signal value is marked as valid if not all the absolute magnitudes calculated making use of this sensor signal value exceed the threshold value. The sensor signal value is marked as invalid if all the absolute magnitudes calculated making use of this sensor signal value exceed the threshold value. The output signal value is determined making use of the sensor signal values that are marked as valid, wherein sensor signal values that are marked as invalid are not taken into consideration.

Through such a procedural method, in examples of the present disclosure, a faulty channel can be found making use of the absolute magnitudes dX12, dX23 and dX13.

The absolute magnitudes of the differences are calculated as:

$$dX12 = X1 - X2$$

$$dX23 = X2 - X3$$

$$dX13 = X1 - X3$$

To check whether one of the channels is faulty, a verification is made as to whether the absolute magnitude of each difference exceeds a threshold value dsml of a safety mechanism or not. If the absolute magnitude exceeds the threshold value, e.g. if it is greater than or equal to the threshold value, then a comparison result receives a first value that indicates this. If the absolute magnitude does not exceed the threshold value, e.g. if it is smaller than the threshold value, then the comparison result receives a second value that indicates this. A comparison result $V_{ij}$ that reflects the result of the comparison with the threshold value can thus be determined for each absolute magnitude. The indices i and j here indicate the pair of sensors for which the absolute magnitude was calculated.

In examples, one bit can be determined as the comparison result $V_{ij}$, wherein a value of 1 can stand for a valid absolute magnitude and a value of 0 for an invalid absolute magnitude. Comparison results can thus be determined as follows for the three sensors 102, 104 and 106:

$$V12 = \begin{cases} 1, & |dX12| < dsml \\ 0, & |dX12| \geq dsml \end{cases}$$

$$V23 = \begin{cases} 1, & |dX23| < dsml \\ 0, & |dX23| \geq dsml \end{cases}$$

$$V13 = \begin{cases} 1, & |dX13| < dsml \\ 0, & |dX13| \geq dsml \end{cases}$$

To check whether a channel lies outside a valid range, a check is made as to whether the absolute magnitudes of all the differences in which the sensor signal value of this channel has been employed are greater than the threshold value dsml. If not all the absolute magnitudes are greater than the threshold value, it is assumed that the channel is not faulty. If all the absolute magnitudes are greater than the threshold value, it is assumed that the channel is faulty. This can be indicated by a validity result assigned to the channel.

In examples, the validity result can comprise a validity bit $X_{i\_ok}$ that indicates for each channel i whether it is has been assessed as faulty or not:

$$X1\_ok = \begin{cases} 0, & V12 = 0 \text{ and } V13 = 0 \\ 1, & \text{else} \end{cases}$$

$$X2\_ok = \begin{cases} 0, & V12 = 0 \text{ and } V23 = 0 \\ 1, & \text{else} \end{cases}$$

$$X3\_ok = \begin{cases} 0, & V13 = 0 \text{ and } V13 = 0 \\ 1, & \text{else} \end{cases}$$

The final output signal value can then be ascertained making use of the sensor signal values of the channels that have not been assessed as faulty, in that the mean value of the sensor signal values of these channels is calculated:

$$Y = \frac{X1 \cdot X1\_ok + X2 \cdot X2\_ok + X3 \cdot X3\_ok}{X1\_ok + X2\_ok + X3\_ok}$$

FIGS. 4A to 4E show simulation results of the example according to aspect 1 with three sensors. The case in which all the signals $X_{i\_ok}=0$ must be collected separately, in order to avoid a division by 0.

Figure 4A:
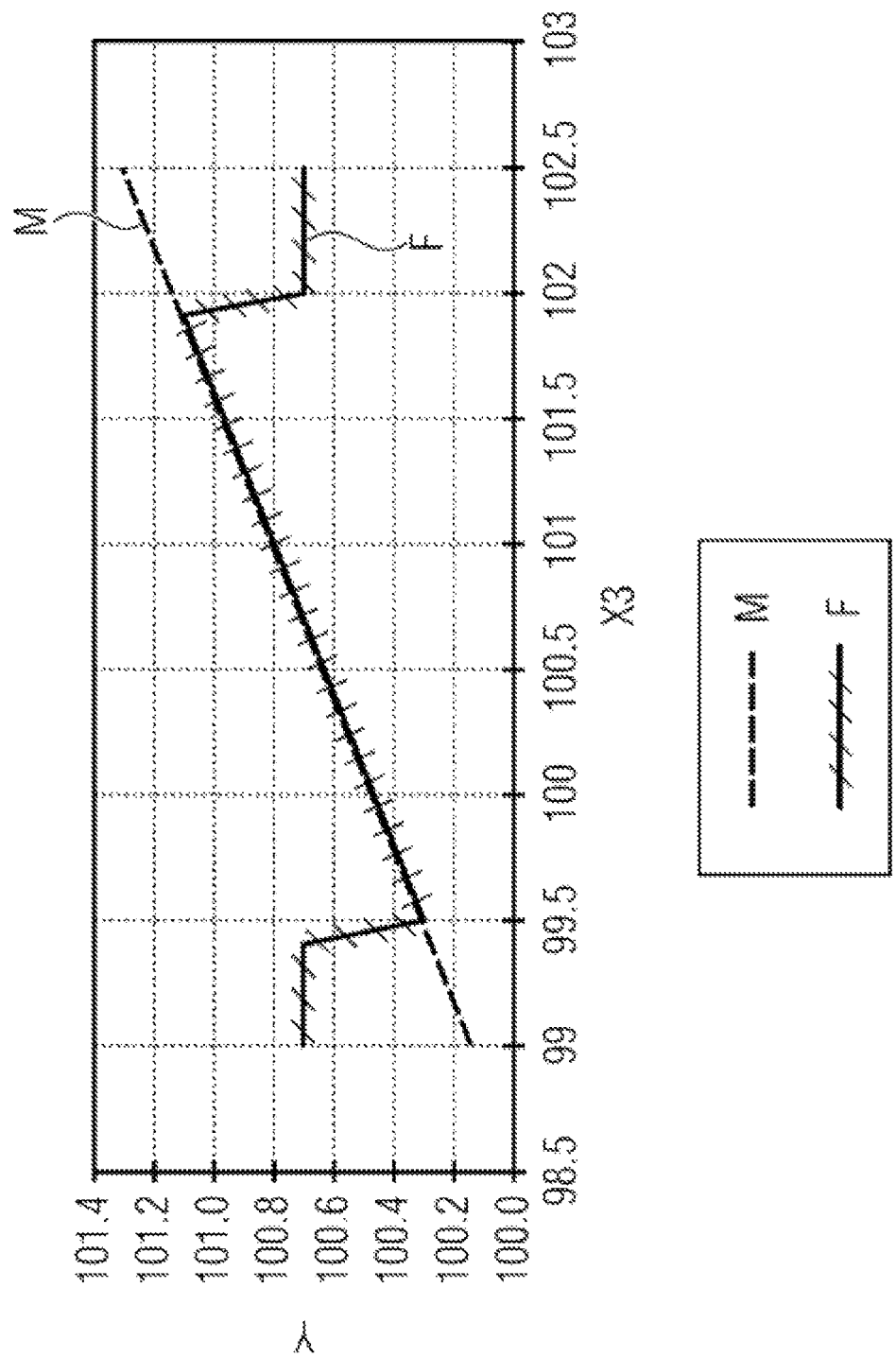
FIGS. 4A to 4E show simulation results according to at least one example of the present disclosure, according to an aspect 1 in which a faulty channel is isolated.

FIG. 4A is based on two fixed values for X1 and X2, namely X1=100.5 and X2=100.9, as well as a value of X3 that changes between 99 and 102.5. The diagram in FIG. 4A thus represents a fault-sweep of X3 from 99 to 102.5. A curve M in FIG. 4A shows the mean value of the three sensor signal values without any correction being made, while a curve F shows the curve with a correction according to aspect 1 having been made in which, as described above, a channel assessed as faulty is not taken into consideration. The threshold value dsml is 1.0. It can be seen that, when the threshold value is exceeded, an abrupt fault correction begins.

Figure 4B:
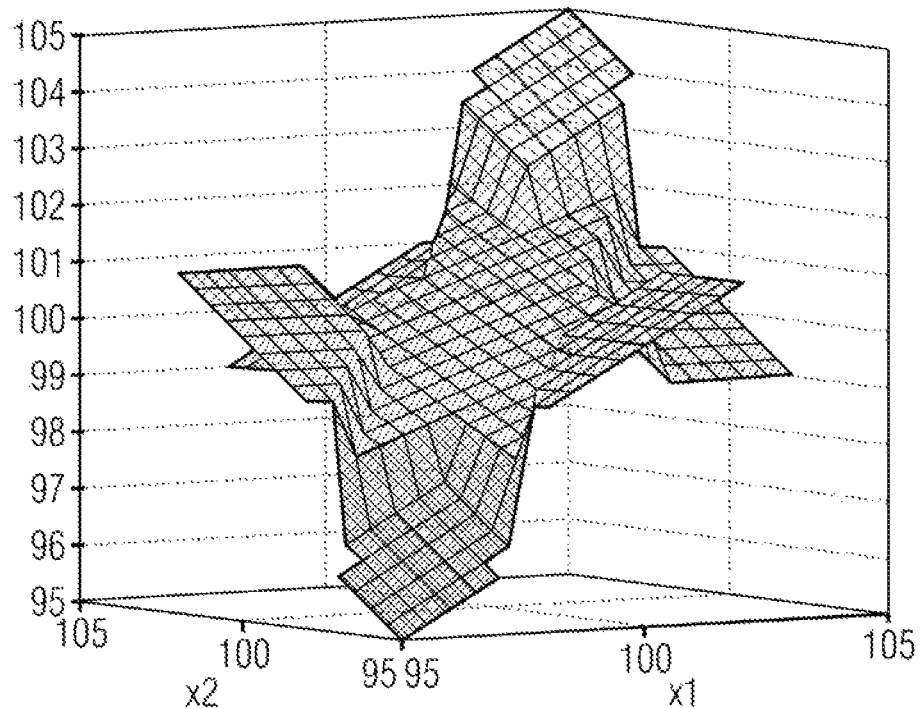
Figure 4C:
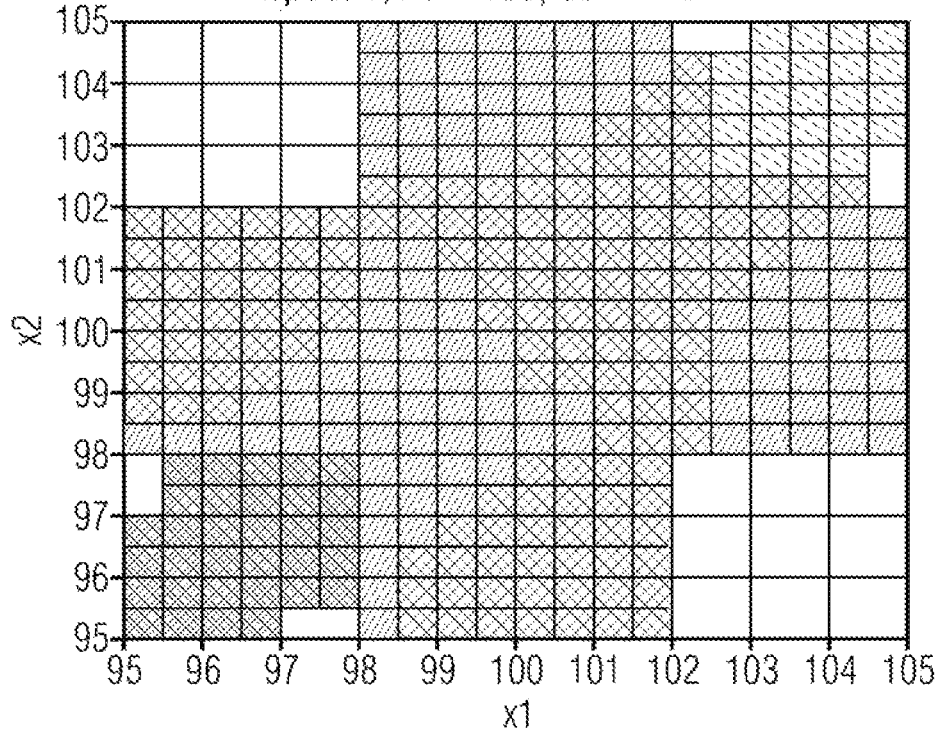

FIGS. 4B and 4C show a simulation result for a case in which two sensor signals were varied while one sensor signal was held constant. But more precisely, in each case a fault-sweep is carried out for X1 and X2 from 95.0 to 105.0. X3 has a fixed value of 100.0, and the threshold value dsml is 2.0. The diagrams each show the resulting output signal Y. White regions in the figures show invalid output signal values, since the absolute values of the differences of two sensor signals are greater than dsml.

Figure 4D:
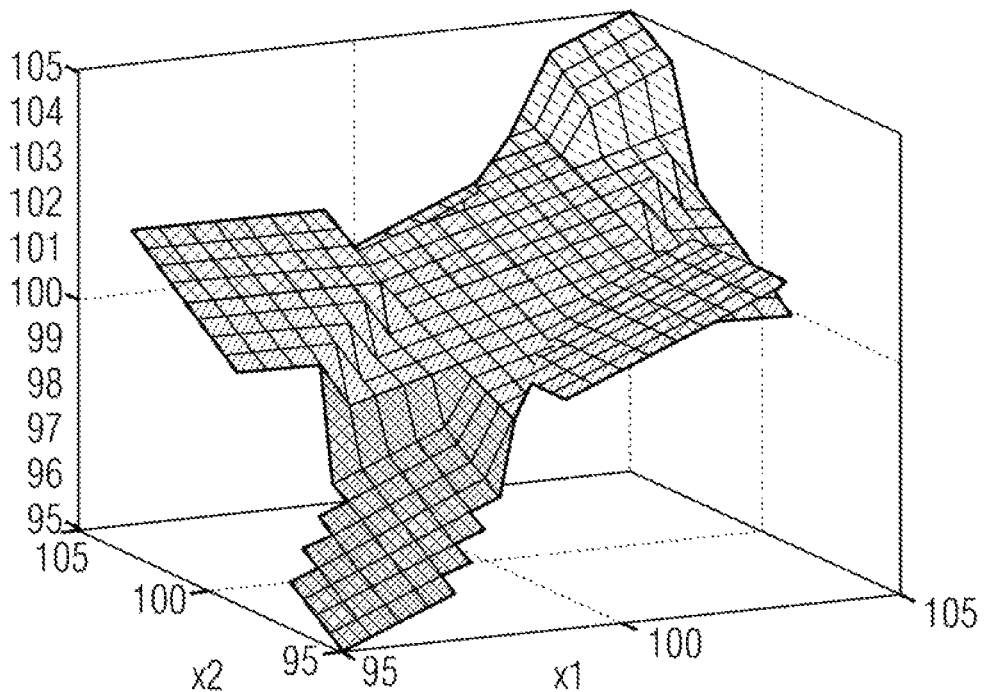
Figure 4E:
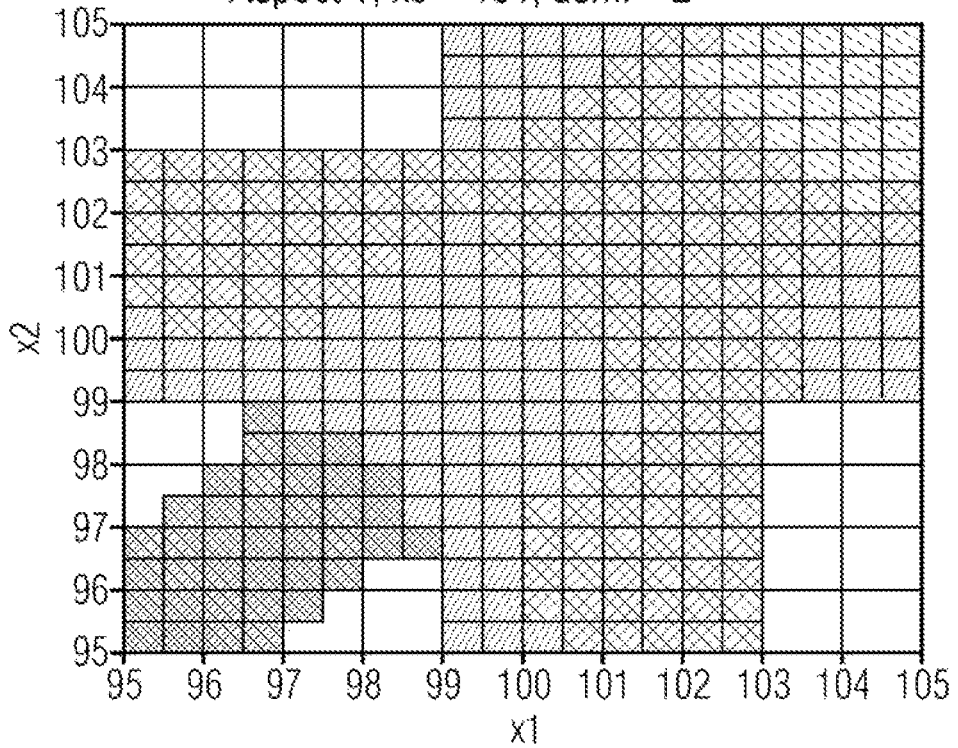

FIGS. 4D and 4E show a corresponding simulation result in which, however, in contrast to FIGS. 4B and 4C, X3 now has a fixed value of 101. The other parameters remain the same. Here again, white regions show invalid output signal values, since the absolute values of the differences of two sensor signals are greater than dsml.

The above calculations are related to an example of aspect 1 with three sensors. For a general number of n sensors, e.g. input channels, the following equations result for aspect 1:

Absolute Magnitudes:

$$dXij = Xi - Xj \text{ with: } i=1, \ldots, n-1, j=i+1, \ldots, n$$

Comparison Results:

$$Vij = \begin{cases} 1, & |dXij| < dsml \\ 0, & |dXij| \geq dsml \end{cases}$$

with: $i = 1, \ldots, n-1, j = i+1, \ldots, n$

Validity Results $$Xi\_ok = \begin{cases} 0, & Vij = 0 \text{ and } Vik = 0 \\ 1, & \text{else} \end{cases}$$

with: $i = 1, \ldots, n$, $j = \text{mod}(i+1, n)$, $k = \text{mod}(i-1, n)$, $Vij = Vji$ Output Signal Value $$Y = \frac{\sum_{i=1}^{n} Xi \cdot Xi\_ok}{\sum_{i=1}^{n} Xi\_ok}$$

Aspect 2

In examples according to aspect 2, a deviation of a difference that is greater than the threshold value, e.g. the safety mechanism threshold, can be taken into consideration, in that respective intermediate mean value signals of two channels are used. It is again here initially assumed that the sensor system comprises three sensors 102, 104 and 106. Intermediate mean value signals for each pair of sensors can be calculated as follows:

$$X12 = \frac{X1 + X2}{2}$$

$$X23 = \frac{X2 + X3}{2}$$

$$X13 = \frac{X1 + X3}{2}$$

X12 here represents the intermediate mean value between the sensors 102 and 104, X23 represents the intermediate mean value between the sensors 104 and 106, and X13 represents the intermediate mean value between the sensors 102 and 106.

Absolute magnitudes dX12, dX23, dX13 and comparison results V12, V23, V13, as was described above with reference to aspect 1, are furthermore calculated. The output signal value Y can then be calculated, making use of the intermediate mean values and the comparison results, as:

$$Y = \frac{X12 \cdot V12 + X23 \cdot + X13 \cdot V13}{V12 + V23 + V13}$$

Since the comparison result is zero when the absolute value of the difference is greater than the threshold value, only information from valid sensor channels is included in the calculation of the output signal value Y. For the case in which one of the channels is outside the safety mechanism threshold, e.g. exceeds the threshold value, this method results in a less substantial jump in the output signal.

Figure 5A:
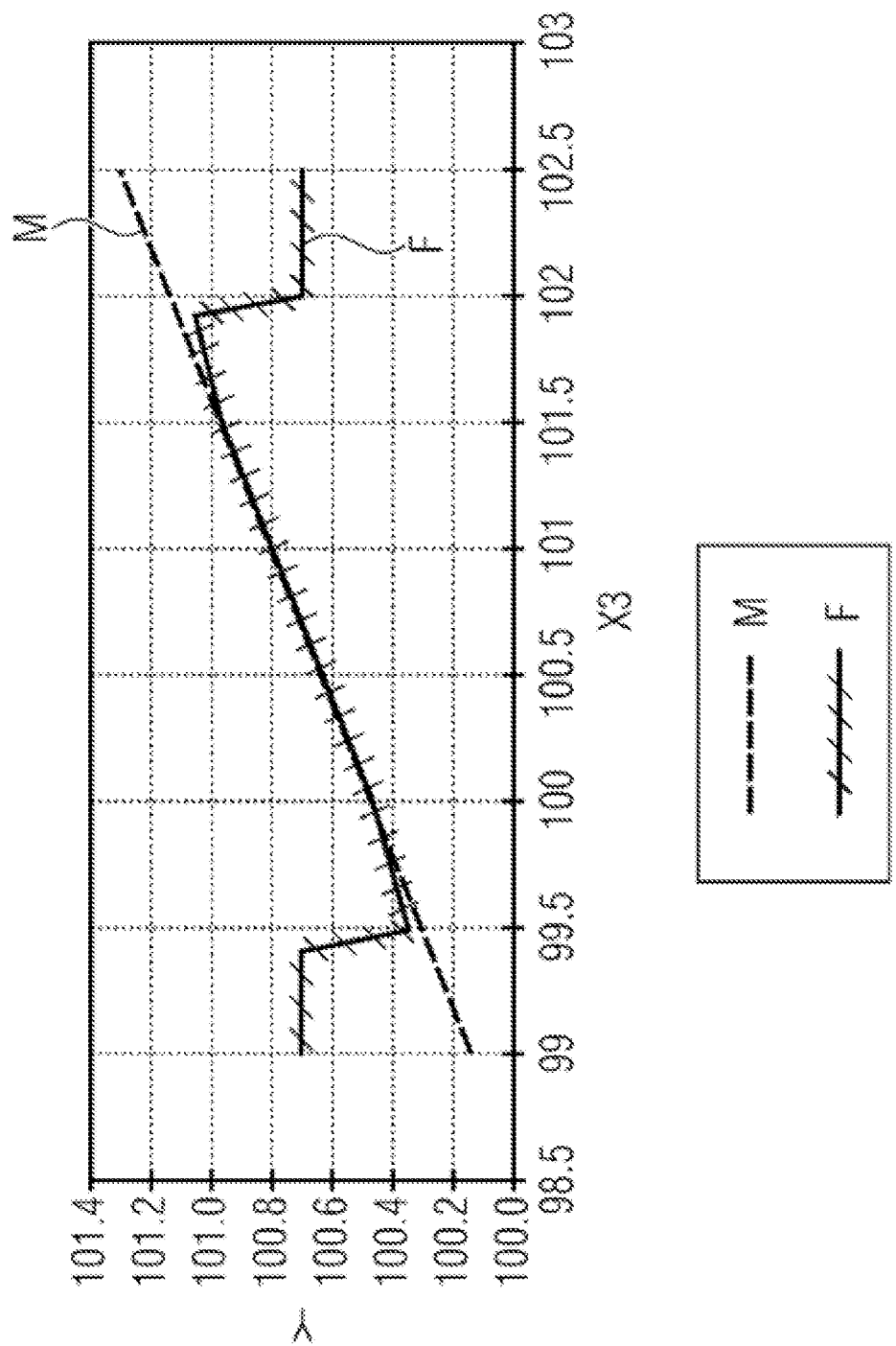
FIGS. 5A to 5C show simulation results according to at least one example of the present disclosure, according to an aspect 2 in which a faulty channel is taken into consideration.
Figure 5B:
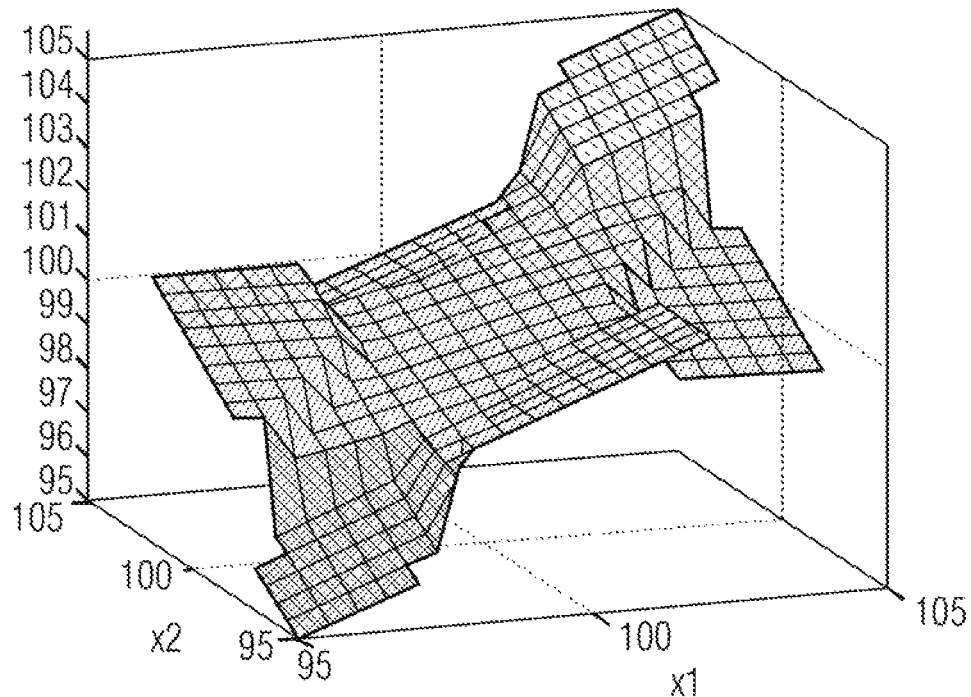
Figure 5C:
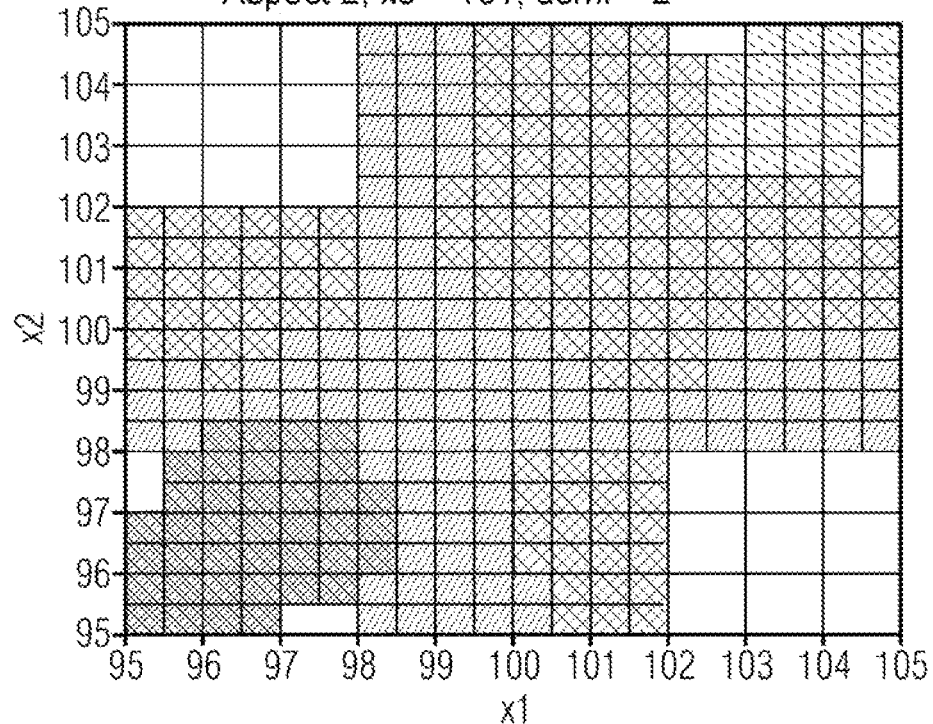

FIGS. 5A to 5C show simulation results of the example according to aspect 2 with three sensors. The case in which all the signals Vij=0 must be collected separately, in order to avoid a division by 0.

In the simulation of FIG. 5A, X1 and X2 have fixed values, namely X1=100.5 and X2=100.9. The value of X3 changes between 99 and 102.5. A curve M in FIG. 5A shows the mean value of the three sensor signal values without any correction being made, while a curve F shows the curve with a correction being made according to aspect 2. The threshold value dsml is 1.0. It can be seen that when the threshold value is exceeded, a fault correction takes place that is less abrupt than is the case with aspect 1.

FIGS. 5B and 5C show a simulation result for a case in which two sensor signals are varied while one sensor signal is held constant. Put more precisely, a fault-sweep of X1 and X2 is carried out from 95.0 to 105.0, e.g. the values of X1 and X2 change between 95.0 and 105.0. X3 has a fixed value of 100.0, and the threshold value is 2.0. The diagrams each show the resulting output signal Y. White regions in the figures show invalid output signal values, since the absolute values of the differences of two sensor signals are greater than dsml.

The equations related to aspect 2 for the general case of n redundant sensors are as follows:

Intermediate Mean Values $$Xij = \frac{Xi + Xj}{2}$$

with: $i = 1, \ldots, n-1$, $j = i+1, \ldots, n$

Comparison Results $$Vij = \begin{cases} 1, & |dXij| < dsml \\ 0, & |dXij| \geq dmsl \end{cases}$$

with: $i = 1, \ldots, n-1$, $j = i+1, \ldots, n$

Output Signal Value $$Y = \frac{\sum_{i=1}^{n-1} \sum_{j=i+1}^{n} Xij \cdot Vij}{\sum_{i=1}^{n-1} \sum_{j=i+1}^{n} Vij}$$

In examples of the present disclosure, the device or the method is thus designed to compare each of the ascertained absolute magnitudes with a threshold value, to calculate mean values of all possible pairs of sensor signal values, and to take into consideration mean values of pairs of sensor signal values whose absolute magnitude does not exceed the threshold value when determining the output signal value, and not to take into consideration mean values of pairs of sensor signal values whose absolute magnitude exceeds the threshold value when determining the output signal value.

Aspect 3

In examples of the present disclosure according to an aspect 3, weighting factors are used in order to use sensor signal values of each channel in a weighted manner. In such examples, the computing device can be configured to calculate mean values of all possible pairs of sensor signal values, so that an associated absolute magnitude and an associated mean value are calculated for each pair. The computing device can, further, be configured to determine for each pair an associated weighting factor that depends on a distance of the associated absolute magnitude from a threshold value, and to determine the output signal value by making use of the calculated mean values and the determined weighting factors. A proportional channel accumulation can thus be used in examples in order to determine the output signal value.

Artificial weighting factors can thus be used in examples in order to calculate a contribution of each channel to the final output signal value. In examples here, a combination of intermediate mean values, respectively representing mean values of all the channel pairs, is used.

As in aspect 2, absolute magnitudes dX12, dX23, dX13 and intermediate mean value signals X12, X23 and X13 are calculated.

Weighting factors can then be ascertained as follows:

$$G12 = \begin{cases} dsml - |dX12|, & dsml - |dX12| > 0 \\ 0, & \text{else} \end{cases}$$

$$G23 = \begin{cases} dsml - |dX23|, & dsml - |dX23| > 0 \\ 0, & \text{else} \end{cases}$$

$$G13 = \begin{cases} dsml - |dX13|, & dsml - |dX13| > 0 \\ 0, & \text{else} \end{cases}$$

G12 here represents the weighting factor for the intermediate mean value signal X12, G23 the weighting factor for the intermediate mean value signal X23, and G13 the weighting factor for the intermediate mean value signal X13. These weighting factors can then be used in order to combine the intermediate mean value signals together in order to calculate the output signal value Y:

$$Y = \frac{X12 \cdot G12 + X23 \cdot G23 + X13 \cdot G13}{G12 + G23G + G13}$$

Figure 6A:
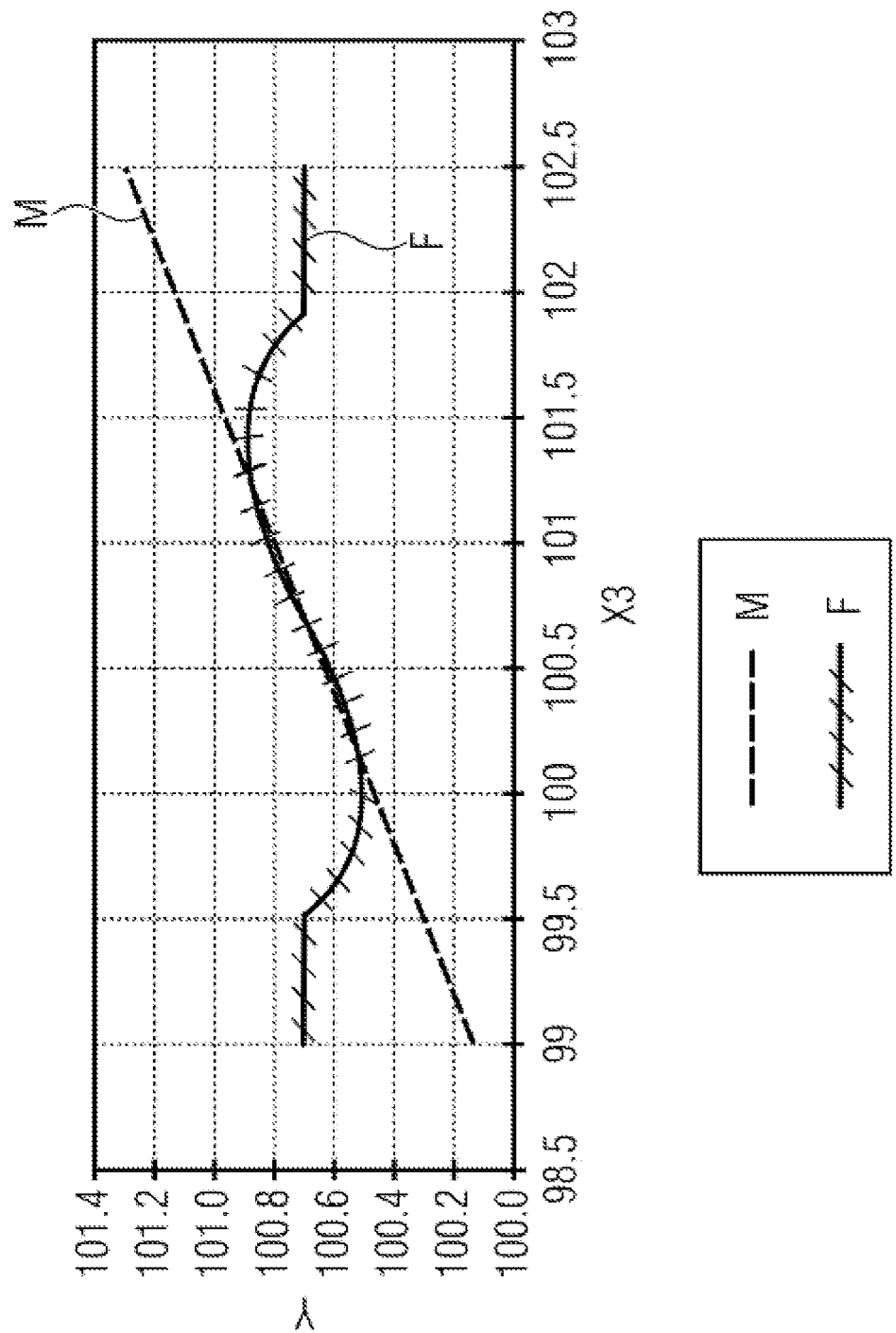
FIGS. 6A to 6C show simulation results according to at least one example of the present disclosure, according to an aspect 3 in which weighting factors are used.
Figure 6B:
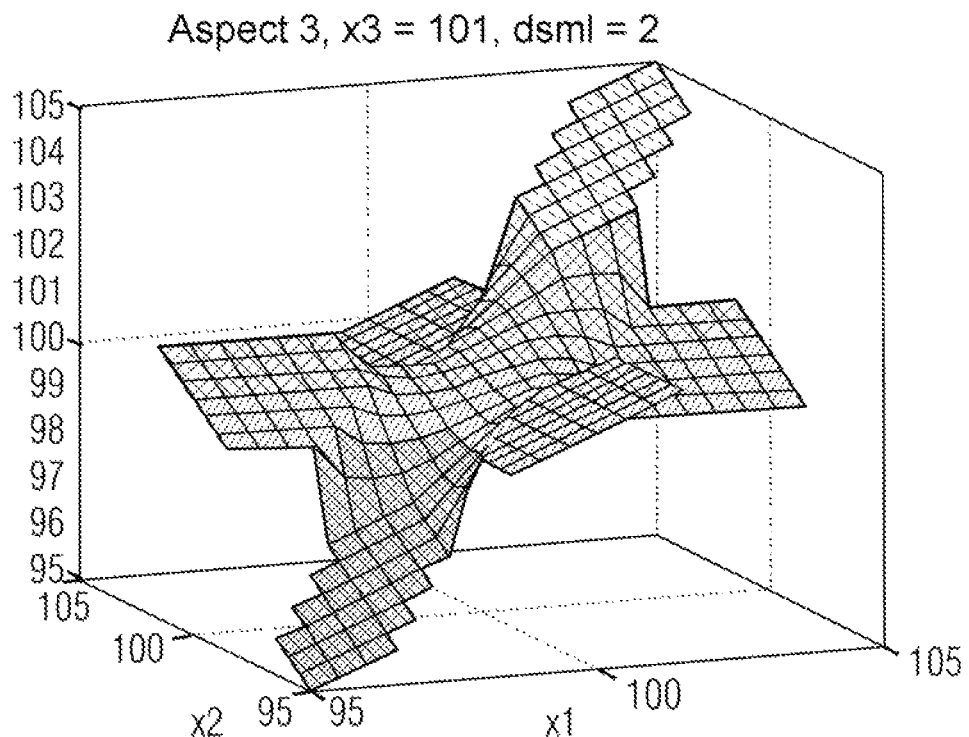
Figure 6C:
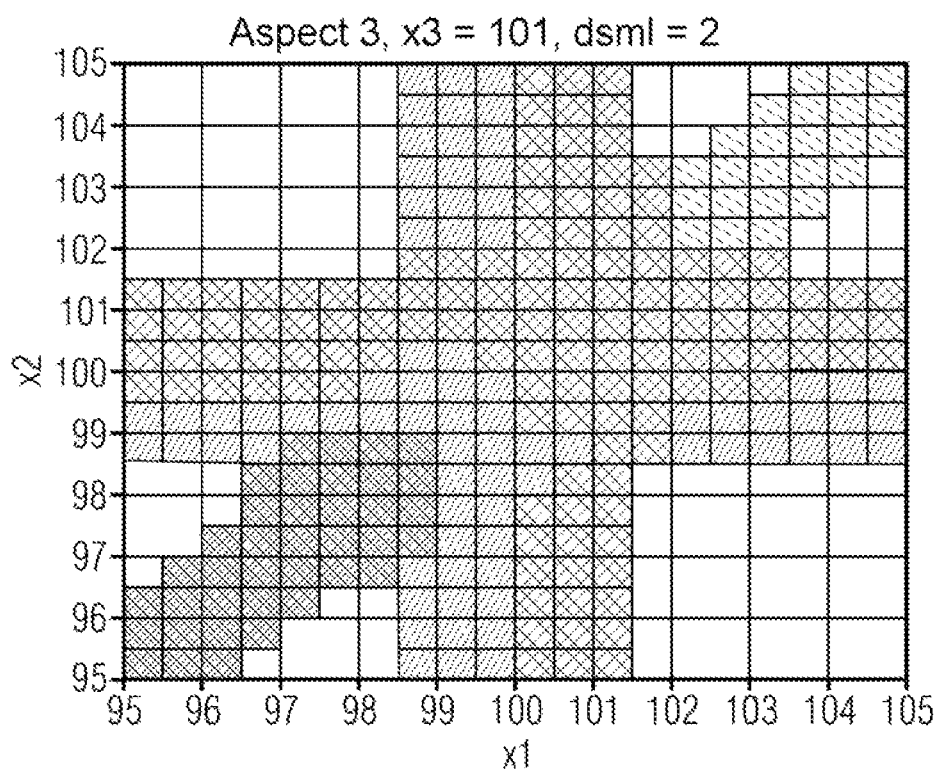

FIGS. 6A to 6C show simulation results of the example according to aspect 3 with three sensors. The case in which all the signals Gij=0 must be collected separately, in order to avoid a division by 0.

In the simulation of FIG. 6A, X1 and X2 have fixed values, namely X1=100.5 and X2=100.9. The value of X3 changes between 99 and 102.5. A curve M in FIG. 6A shows the mean value of the three sensor signal values without any correction being made, while a curve F shows the curve with a correction being made according to aspect 3. The threshold value dsml is 1.0. It can be seen that when the threshold value is exceeded, a fault correction takes place that is less abrupt than is the case with aspect 1 or aspect 2.

FIGS. 6B and 6C show a simulation result for a case in which two sensor signals are varied while one sensor signal is held constant. Put more precisely, a fault-sweep of X1 and X2 is carried out from 95.0 to 105.0, e.g. the values of X1 and X2 are changed between 95.0 and 105.0. X3 has a fixed value of 100.0, and the threshold value is 2.0. The diagrams each show the resulting output signal Y. White regions in the figures show invalid output signal values, since the absolute values of the differences of two sensor signals are greater than dsml.

The equations related to aspect 3 for the general case of n redundant sensors are as follows:

Absolute Magnitudes:

$$dXij = Xi - Xj \text{ with: } i=1, \ldots, n-1, j=i+1, \ldots, n$$

Intermediate Mean Values $$Xij = \frac{xi + xj}{2} \text{ with: } i = 1, \ldots, n-1, j = i+1, \ldots, n$$

Weighting Factors $$Gij = \begin{cases} dsml - |dXij|, & dsml - |dXij| > 0 \\ 0, & \text{else} \end{cases}$$

with: $i = 1, \ldots, n-1, j = i+1, \ldots, n$

Output Signal Value $$Y = \frac{\sum_{i=1}^{n-1} \sum_{j=i+1}^{n} Xij \cdot Gij}{\sum_{i=1}^{n-1} \sum_{j=i+1}^{n} Gij}$$

Aspect 4

In examples of the present disclosure according to an aspect 4, weighting factors are again used, ascertained making use of a square root function. In the example implementations of the present disclosure, it is thereby possible to smooth the fault function yet further. In this example, G12, G23 and G13 can be ascertained in accordance with the following equations:

$$G12 = \begin{cases} \sqrt{dsml - |dX12|}, & dsml - |dX12| > 0 \\ 0, & \text{else} \end{cases}$$

$$G23 = \begin{cases} \sqrt{dsml - |dX23|}, & dsml - |dX23| > 0 \\ 0, & \text{else} \end{cases}$$

$$G13 = \begin{cases} \sqrt{dsml - |dX23|}, & dsml - |dX13| > 0 \\ 0, & \text{else} \end{cases}$$

The output signal value can then be calculated making use of these weighting factors as:

$$Y = \frac{X12 \cdot G12 + X23 \cdot G23 + X13 \cdot G13}{G12 + G23 + G13}$$

Figure 7A:
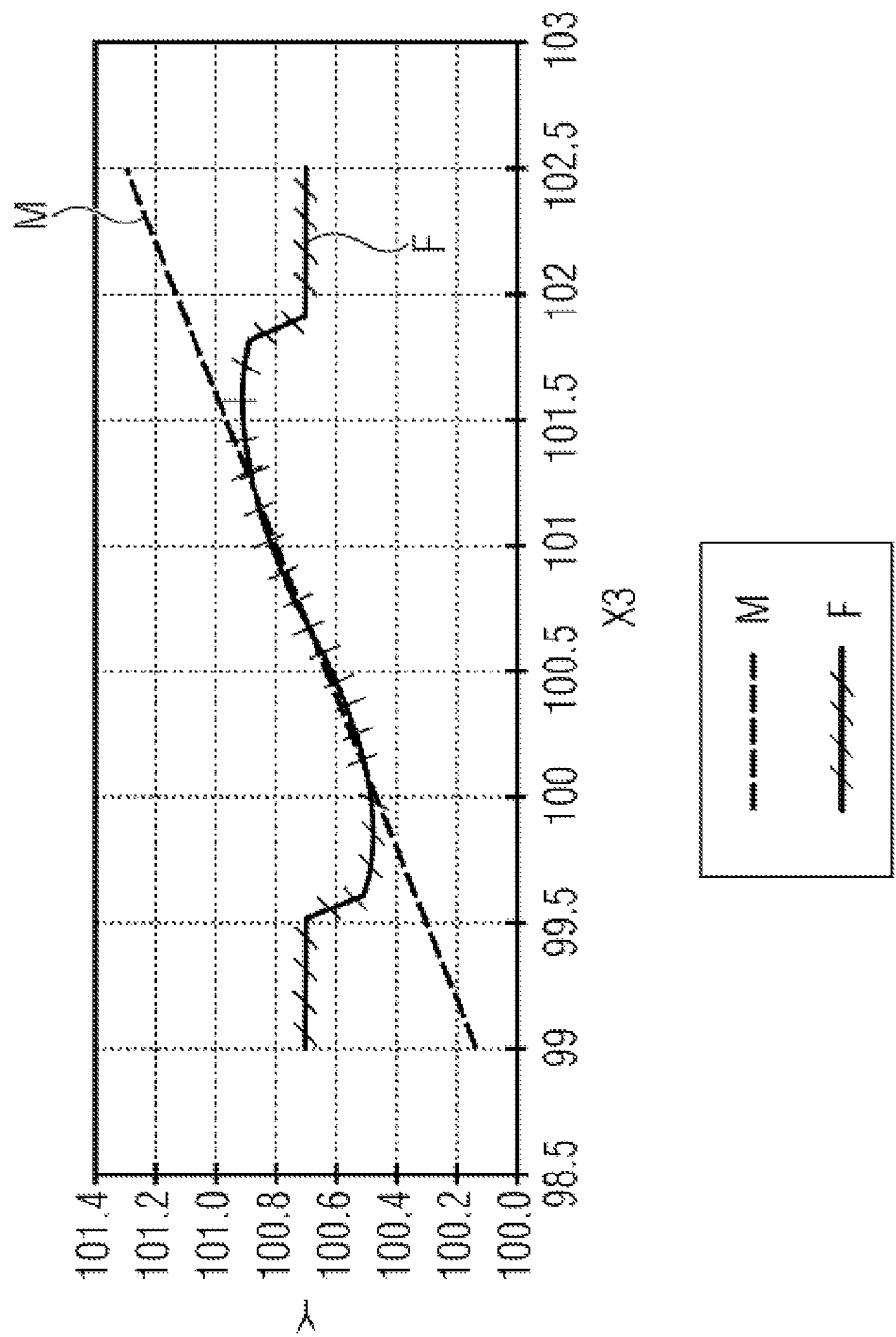
FIGS. 7A to 7C show simulation results according to at least one example of the present disclosure, according to an aspect 4 in which square root weighting factors are used.
Figure 7B:
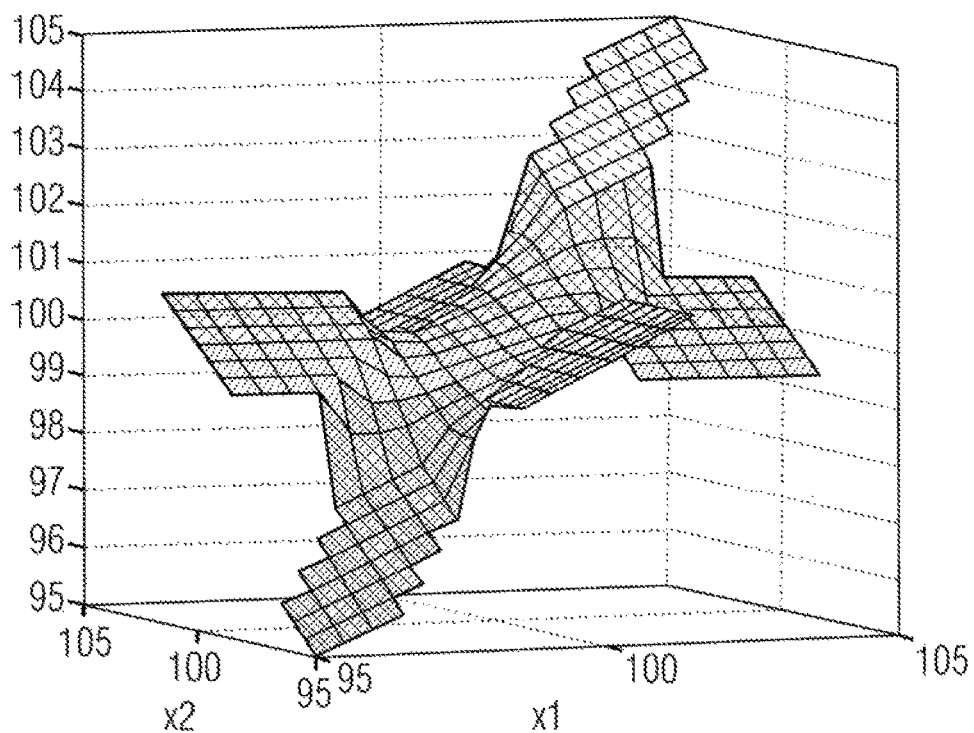
Figure 7C:
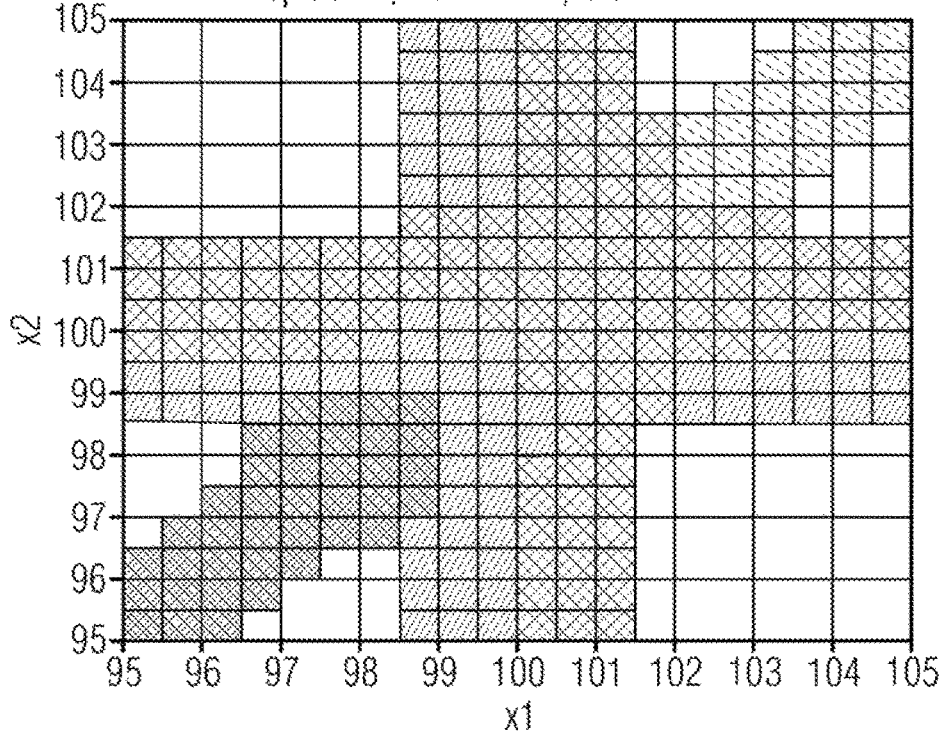

FIGS. 7A to 7C show simulation results of the example according to aspect 4 with three sensors.

In the simulation of FIG. 7A, X1 and X2 have fixed values, namely X1=100.5 and X2=100.9. The value of X3 changes between 99 and 102.5. A curve M in FIG. 7A shows the mean value of the three sensor signal values without any correction being made, while a curve F shows the curve with a correction being made according to aspect 4. The threshold value dsml is 1.0. It can be seen that, when the threshold value is exceeded, a fault correction takes place that is less abrupt than is the case with aspects 1 to 3.

FIGS. 7B and 7C show a simulation result for a case in which two sensor signals are varied while one sensor signal is held constant. Put more precisely, a fault-sweep of X1 and X2 is carried out from 95.0 to 105.0, e.g. the values of X1 and X2 are changed between 95.0 and 105.0. X3 has a fixed value of 100.0, and the threshold value is 2.0. The diagrams each show the resulting output signal Y. White regions in the figures show invalid output signal values, since the absolute values of the differences of two sensor signals are greater than dsml.

The equations related to aspect 4 for the general case of n redundant sensors are as follows:

Absolute Magnitudes:

$$dX_{ij} = X_i - X_j \text{ with: } i=1,\ldots,n-1, j=i+1,\ldots,n$$

Intermediate Mean Values $$X_{ij} = \frac{X_i + X_j}{2}$$

with: $i = 1, \ldots, n-1, j = i+1, \ldots, n$

Weighting Factors $$G_{ij} = \begin{cases} \sqrt{dsml - |dX_{ij}|}, & dsml - |dX_{ij}| > 0 \\ 0, & \text{else} \end{cases}$$

with: $i = 1, \ldots, n-1, j = i+1, \ldots, n$

Output Signal Value $$Y = \frac{\sum_{i=1}^{n-1} \sum_{j=i+1}^{n} X_{ij} \cdot G_{ij}}{\sum_{i=1}^{n-1} \sum_{j=i+1}^{n} G_{ij}}$$

In the examples according to aspect 3 and aspect 4, the weighting factor in each case is 0 if the absolute magnitude of the difference is greater than the threshold value. Thus here again only those sensor channels that are deemed not to be faulty are taken into consideration.

Aspect 5

In examples of the present disclosure according to aspect 5, for each sensor signal value a deviation between the sensor signal value and a mean value of all the other sensor signal values is ascertained. The sensor signal value for which the largest deviation has been ascertained is then determined, and is not taken into consideration in the determination of the output signal value. Thus when calculating the mean value with which the output signal value is calculated, only the mean value of each of the channels that have the lowest deviation from one another is taken into consideration. As a result, the sensor signal of a sensor that is faulty is not included in the calculation, since this will show the largest deviation from the mean value of all the other sensor signal values.

The deviation of the sensor signal value of each channel from the mean value of the other channels can be calculated as follows:

$$dX1\_23 = X1 - X23$$

$$dX2\_13 = X2 - X13$$

$$dX3\_12 = X3 - X12$$

Here, dX1_23 represents the deviation of the channel with the sensor signal value X1 from the mean value of the two other channels, dX2_13 represents the deviation of the channel with the sensor signal value X2 from the mean value of the other two channels, and dX3_12 represents the deviation of the channel with the sensor signal value X3 from the mean value of the two other channels. The intermediate mean values X23, X13 and X12 can be ascertained as was described above with reference to aspect 2.

The deviations are then used in order to select the channels that are used to calculate the output signal value Y:

$$UX1 = \begin{cases} 1, & |dX1\_23| < |dX2\_13| \text{ or } |dX1\_23| < |dX3\_12| \\ 0, & \text{else} \end{cases}$$

$$UX2 = \begin{cases} 1, & |dX2\_13| < |dX1\_23| \text{ or } |dX2\_13| < |dX3\_12| \\ 0, & \text{else} \end{cases}$$

$$UX3 = \begin{cases} 1, & |dX3\_12| < |dX1\_23| \text{ or } |dX3\_12| < |dX2\_13| \\ 0, & \text{else} \end{cases}$$

UX1, UX2 and UX3 here represent the maximum indicator associated with the sensor channels, wherein the maximum indicator is 0 for the channel with the greatest deviation and is 1 for the other channels. The output signal value Y can then be calculated as follows:

$$Y = \frac{X1 \cdot UX1 + X2 \cdot UX2 + X3 \cdot UX3}{UX1 + UX2 + UX3}$$

Figure 8A:
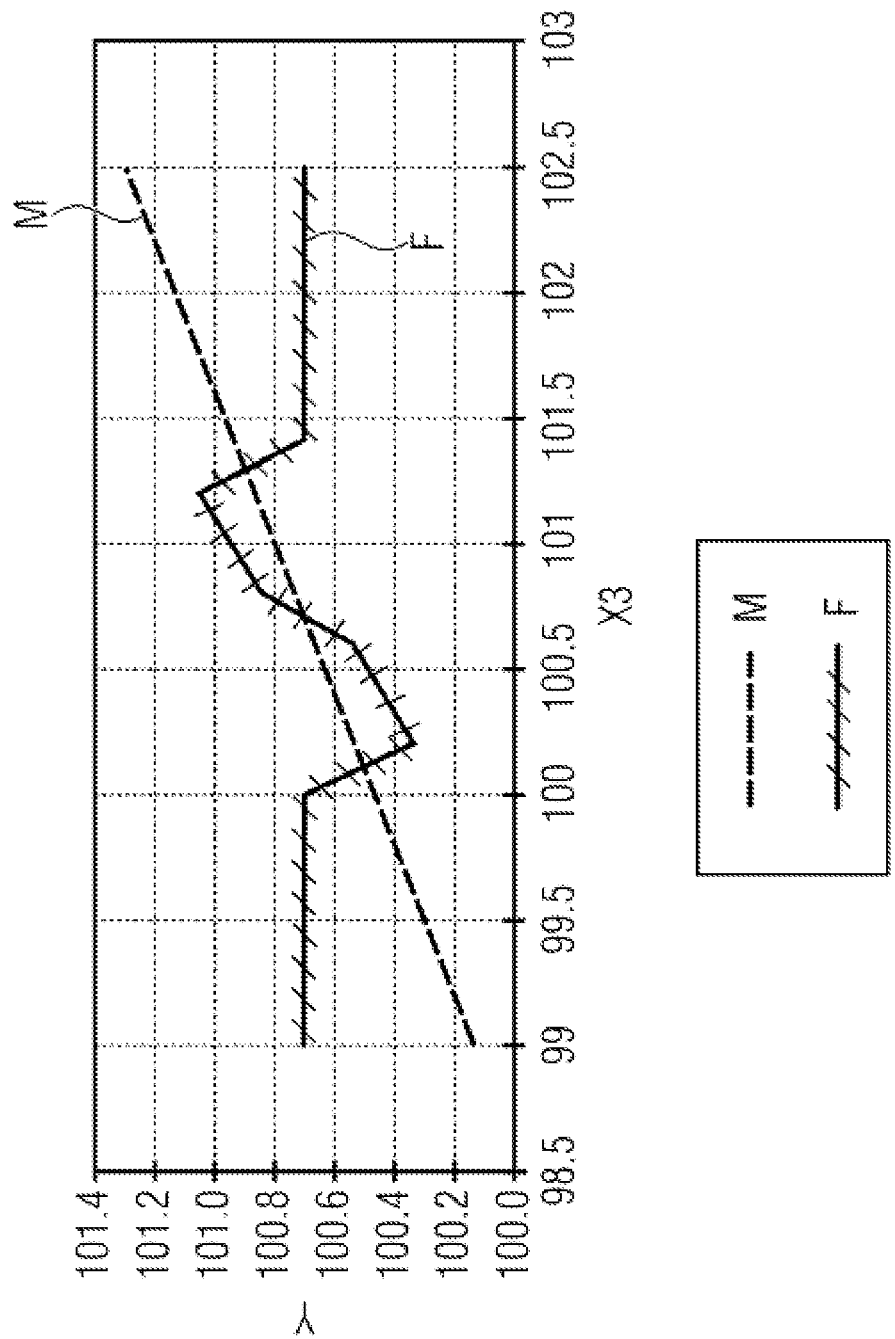
FIGS. 8A to 8C show simulation results according to at least one example of the present disclosure, according to an aspect 5 in which a channel with the largest deviation is excluded.
Figure 8B:
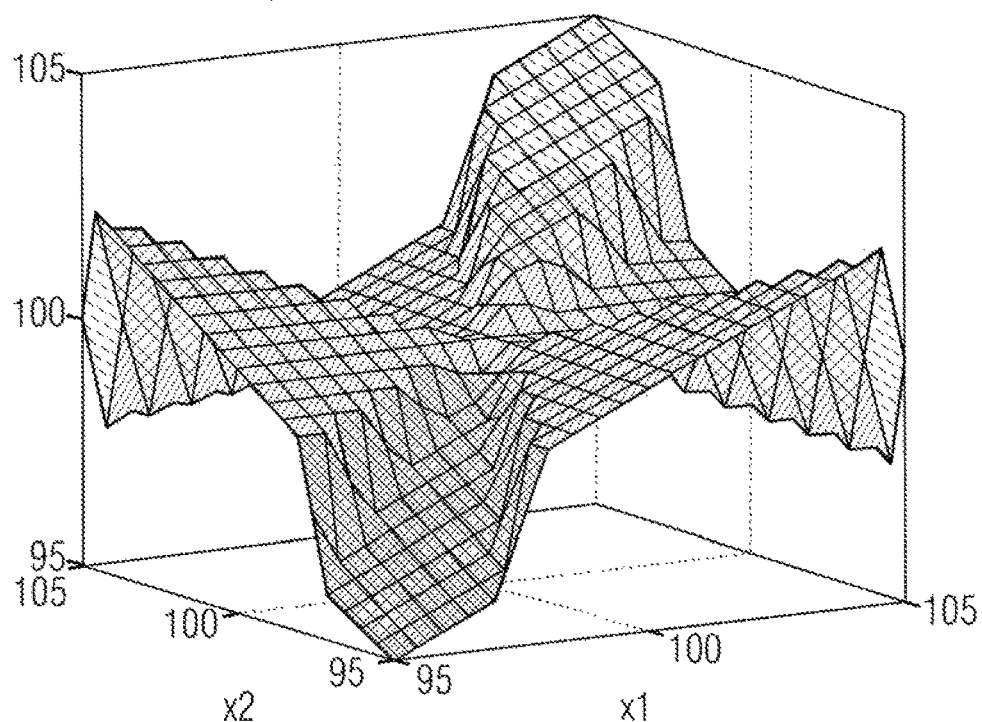
Figure 8C:
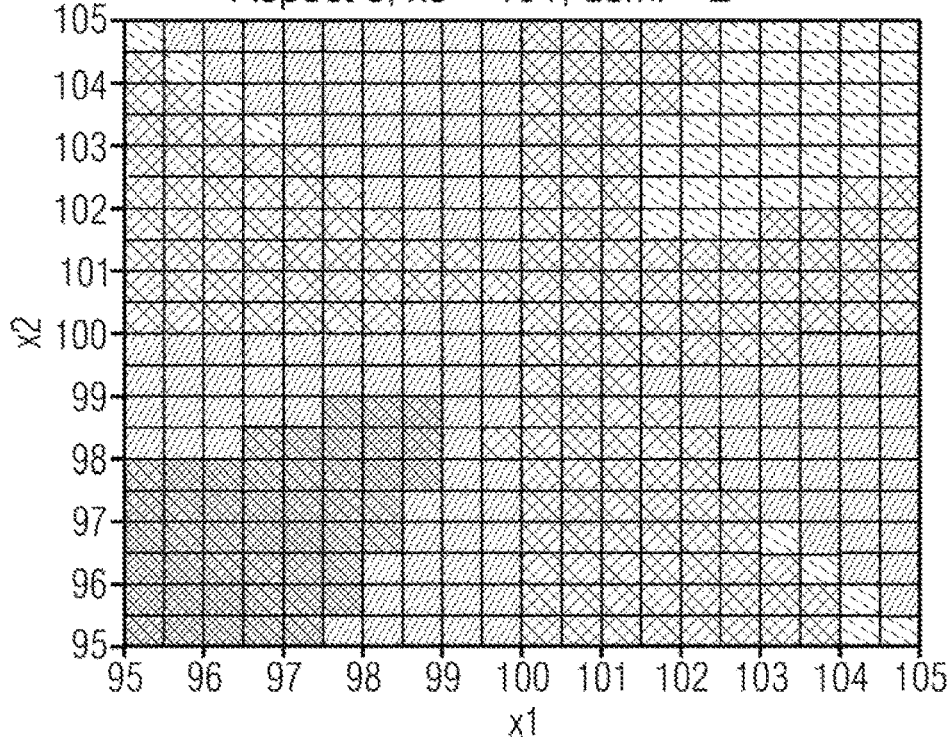

FIGS. 8A to 8C show simulation results of the example according to aspect 5 with three sensors. The case in which all the signals UXi=0 must be collected separately, in order to avoid a division by 0.

In the simulation of FIG. 8A, X1 and X2 had fixed values, namely X1=100.5 and X2=100.9. The value of X3 changed between 99 and 102.5. A curve M in FIG. 7A shows the mean value of the three sensor signal values without any correction being made, while a curve F shows the curve with a correction being made according to aspect 5. It can be seen that when the threshold value is exceeded, a fault correction takes place that is less abrupt than is the case with aspects 1 to 3.

FIGS. 7B and 7C show a simulation result for a case in which two sensor signals are varied while one sensor signal is held constant. Put more precisely, a fault-sweep of X1 and X2 is carried out from 95.0 to 105.0, e.g. the values of X1 and X2 are changed between 95.0 and 105.0. X3 has a fixed value of 100.0. The diagrams each show the resulting output signal Y. FIG. 7C shows that in this case there are no regions with invalid output signal values, with the exception of all three sensor signal values being exactly equal. If this is the case, then in examples the mean value of all three sensor signal values can be calculated as the output signal value.

The equations related to aspect 5 for the general case of n redundant sensors are as follows:

Deviation from the Mean Value of all Other Channels $$dXi = Xi - \frac{\sum_{j=1, j \neq i}^{n} X_j}{n-1} \text{ with: } i = 1, \ldots, n$$

Maximum Indicator $$UXi = \begin{cases} 1, & \text{else} \\ 0, & dXi = \min(dX1, \ldots, dXn) \end{cases} \text{ with: } i = 1, \ldots, n$$

Output Signal Value $$Y = \frac{\sum_{i=1}^{n} Xi \cdot UXi}{\sum_{i=1}^{n} UXi}$$

General

Examples of the present disclosure thus make it possible to calculate a fault-corrected output signal value making use of at least three redundant sensors in an easy manner. The methods and aspects described can be used to carry out a fault-tolerant acquisition and fault correction of three or more redundant sensor channels. In examples here, one or a plurality of dual-chip sensor arrangements and/or one or a plurality of single-chip sensor arrangements can be used in order to implement a sensor system with three or more sensors. In examples, absolute values of the differences between all possible pairs of sensors are calculated, and are taken into consideration in the determination of the output signal value, so that an increased reliability can be achieved. In examples, a sensor channel that has a largest deviation from the other channels is not taken into consideration, so that an increased reliability can again be achieved.

In examples, the computing device can be implemented using any appropriate circuit structures, for example microprocessor circuits, ASIC circuits, CMOS circuits and the like. In examples, the computing device can be implemented as a combination of hardware structures and machine-readable commands. The computing device can, for example, comprise a processor and memory devices that store machine-readable commands that deliver the described functionalities and result in the performance of the method described herein when they are carried out by the processor. In examples, the computing device can be integrated into a sensor device that comprises the redundant sensors. In examples, the computing device and the redundant sensors can be integrated into a sensor module, for example a sensor chip. In examples, the device can be provided separately from a memory module, for example as part of an electronic controller, ECU (electronic control unit). As part of such an electronic controller, examples of the disclosure can enable a reliable external assessment of a sensor behavior.

Examples of the present disclosure thus make it possible in a skillful manner to process redundant acquisition channel information for a fault acquisition and fault correction or for fault reduction, so that a consistent system behavior without signal jumps can be supplied even in the event of a failure of one or a plurality of redundant sensors.

Examples of the present disclosure are suitable for all safety-relevant applications in which state variables have to be acquired reliably. Examples of the present disclosure are in particular suitable for control applications in the field of vehicle technology, whether in the automobile sector, the aeronautical sector or railway sector. Examples of the present disclosure are in particular also suitable for the autonomous vehicle sector.

In examples, the threshold value can in each case be a fixed threshold value. In examples, the threshold value can depend on the absolute values of all the differences that occur. In examples, the height of the threshold value can depend on the safety requirements, wherein for lower safety requirements the threshold value can be higher, and for higher safety requirements the threshold value can be lower. Examples of the present disclosure can enable the threshold value to be set.

If no valid channels are acquired since, for instance, the absolute value of the difference between all the sensors or sensor channels exceeds the threshold value, then in examples of the present disclosure, a corresponding indication that no acquisition is possible making use of the redundant sensor system can be output.

Although some aspects of the present disclosure have been described as features in connection with a device, it is clear that such a description can equally be considered as a description of corresponding method features. Although some aspects have been described as features in connection with a method, it is clear that such a description can also be considered as a description of corresponding features of a device or of the functionality of a device.

Figure 9:
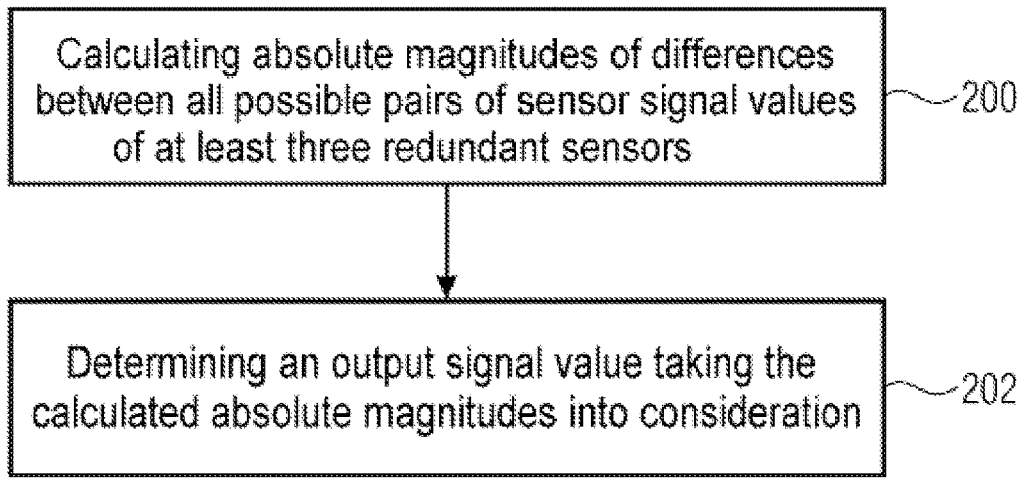
FIG. 9 shows a flow diagram of an example of a method according to the present disclosure, in which the absolute magnitudes of differences between all possible pairs of sensor signal values are calculated.

FIG. 9 shows an example of a method for the generation of an output signal value making use of sensor signal values of at least three redundant sensors. At 200, absolute magnitudes of differences between all possible pairs of the sensor signal values are calculated. At 202, an output signal value is determined taking the calculated absolute magnitudes into consideration.

Figure 10:
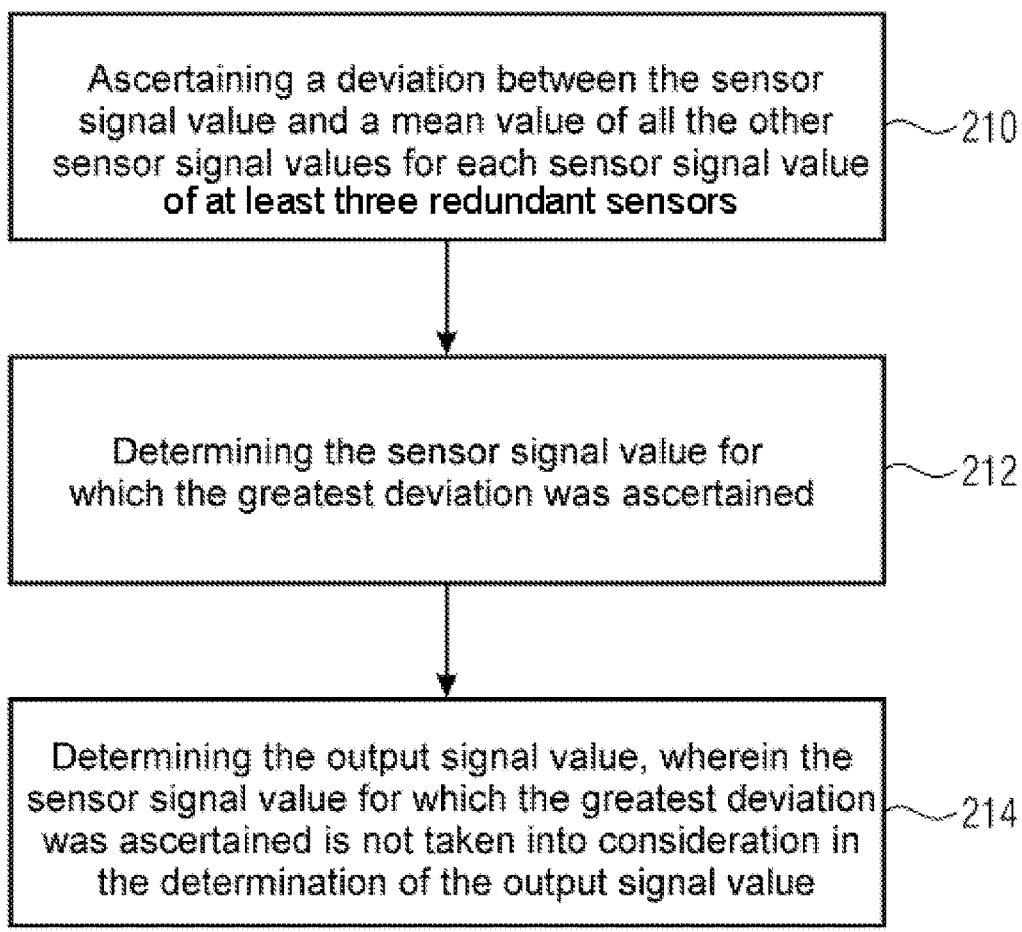
FIG. 10 shows a flow diagram of an example of a method according to the present disclosure, in which a sensor signal value with the largest deviation is not taken into consideration.

FIG. 10 shows another example of a method for the generation of an output signal value making use of sensor signal values of at least three redundant sensors. At 210, for each sensor signal value a deviation between the sensor signal value and a mean value of all the other sensor signal values is determined. At 212, the sensor signal value for which the largest deviation has been ascertained is determined. At 214 the output signal value is determined, wherein the sensor signal value for which the largest deviation has been ascertained is not taken into consideration in the determination of the output signal value.

Depending on specific implementation requirements, examples of the present disclosure can be implemented through any desired combination of circuits, hardware and/or machine-readable commands. Examples of the device described herein can comprise a central processing unit, CPU, a microprocessor and/or any desired hardware device that is suitable for carrying out commands that are stored on a machine-readable medium. Examples of the device can comprise a machine-readable medium that stores machine-readable commands that effect the functionalities described herein when they are executed by a processing device. The machine-readable medium can be implemented through any desired electronic, magnetic, optical or other physical storage medium, for example EPROM, EEPROM, Flash EEPROM, FRAM (ferro-electric RAM), MRAM (magneto resistive RAM), or phase-change RAM. Examples of the present disclosure are related to machine-readable commands which, when they are executed by a processing device, cause the processing device to effect the functionalities as they are described here. Examples of the disclosure relate to a computer program product with instructions which, when they are executed on a computing device such as a computer, carry out a method or effect a functionality as they are described here.

The present disclosure provides depictions and descriptions, but it is not intended that these are exhaustive or that the implementations are restricted to the precise form that has been disclosed. Modifications and variations are possible in the light of the above disclosure, or can be obtained from the practice of the implementations. Although particular combinations of features are adduced in the patent claims and/or are disclosed in the description, it is not intended that these features restrict the disclosure of possible implementations. Many of these features can in fact be combined in ways that are not specifically adduced in the patent claims and/or disclosed in the description. Although each of the dependent patent claims adduced below possibly depends directly on only one or a few patent claims, the disclosure of possible implementations includes every dependent patent claim in combination with all other patent claims in the set of patent claims.

The examples described above are only illustrative for the fundamental principles of the present disclosure. It must be understood that modifications and variations of the arrangements and of the details that are described are obvious for experts in the field. It is therefore intended that the disclosure is only restricted by the appended patent claims and not through the specific details that are presented for the purpose of the description and explanation of the examples.

LIST OF REFERENCE SIGNS 10, 20, 30, 40 Redundant sensor systems
12 Sensor chip
14 Housing
32 Lead frame
42 Sensor chip
50, 52 Sensor channels
54 First computing device
56 Second computing device
100 Device for determining an output signal value
102, 104, 104 Redundant sensors or sensor channels
110, 112, 114 Difference formation blocks
120 Output signal value determination block

The invention claimed is:

1. A device for generating an output signal value making use of sensor signal values of at least three redundant sensors, the device comprising:
   a computing device that is configured to:
      calculate mean values of possible pairs of sensor signal values, so that an associated absolute magnitude and an associated mean value are calculated for each pair of the possible pairs;
      determine an associated weighting factor for each pair, of the possible pairs, that depends on a distance of the associated absolute magnitude from a threshold value;
      determine, based on the calculated mean values and the determined weighting factors, contributions of channels associated with the at least three redundant sensors;
      determine the output signal value based on a proportional channel accumulation using the determined contributions of channels;
      perform, based on the output signal value, at least one of a fault-tolerant acquisition or fault correction of at least three redundant sensor channels associated with the at least three redundant sensors; and
      generate an output signal based on performing at least one of the fault-tolerant acquisition or the fault correction.

2. The device as claimed in claim 1, wherein the computing device is configured to:
   compare each calculated absolute magnitudes with another threshold value;
   check, for each sensor signal value of the pair of signal values, whether the absolute magnitudes calculated making use of the sensor signal value exceed the other threshold value, and mark the sensor signal value as valid if not all the absolute magnitudes calculated making use of the sensor signal value exceed the other threshold value;
   mark the sensor signal value as invalid if all the absolute magnitudes calculated making use of the sensor signal value exceed the other threshold value; and
   determine the output signal value making use of the sensor signal values that are marked as valid.

3. The device as claimed in claim 2, wherein the computing device is configured to determine the output signal value as a mean value of all the sensor signal values that have been marked as valid.

4. The device as claimed in claim 2, wherein the computing device is configured to:
   calculate absolute magnitudes dXij of sensor signal values of n redundant sensors in accordance with $$dXij = Xi - Xj \text{ with: } i=1,\ldots,n-1, j=i+1,\ldots,n$$

determine a comparison result Vij for each absolute magnitude with respect to a threshold value dsml in accordance with $$Vij = \begin{cases} 1, & |dXij| < dsml \\ 0, & |dXij| \geq dsml \end{cases}$$

with $i = 1, \ldots, n-1, j = i+1, \ldots, n$ determine a validity result Xi_ok for each sensor signal value in accordance with $$\text{Xi\_ok} = \begin{cases} 0, & \text{if } Vij = 0 \text{ and } Vik = 0 \\ 1, & \text{else} \end{cases}$$

with: $i = 1 \ldots n, j = \mod(i+1, n), k = \mod(i-1, n), Vij = Vji$ and determine the output signal value Y in accordance with $$Y = \frac{\sum_{i=1}^{n} Xi \cdot \text{Xi\_ok}}{\sum_{i=1}^{n} \text{Xi\_ok}}$$

5. The device as claimed in claim 1, wherein the computing device is configured to:
   compare each of the calculated absolute magnitudes with another threshold value;
   calculate mean values of the possible pairs of sensor signal values; and
   take mean values of pairs of sensor signal values whose absolute magnitude does not exceed the other threshold value into consideration when determining the output signal value, and not take mean values of pairs of sensor signal values whose absolute magnitude exceeds the other threshold value into consideration when determining the output signal value.

6. The device as claimed in claim 5, wherein the computing device is configured to:
   calculate absolute magnitudes dXij of sensor signal values of n redundant sensors in accordance with $$dXij = Xi - Xj \text{ with: } i=1,\ldots,n-1, j=i+1,\ldots,n$$

determine a comparison result Vij for each absolute magnitude with respect to a threshold value dsml in accordance with $$Vij = \begin{cases} 1, & |dXij| < dsml \\ 0, & |dXij| \geq dsml \end{cases}$$

with: $i = 1 \ldots n-1, j = i+1 \ldots n$ calculate mean values of the possible pairs of sensor signal values in accordance with $$Xij = \frac{Xi + Xj}{2}$$

with: $i = 1 \ldots n-1, j = i+1 \ldots n$ and
calculate the output signal value Y in accordance with $$Y = \frac{\sum_{i=1}^{n-1} \sum_{j=i+1}^{n} Xij \cdot Vij}{\sum_{i=1}^{n-1} \sum_{j=i+1}^{n} Vij}$$

7. The device as claimed in claim 1, wherein the computing device is configured to:
calculate absolute magnitudes dXij of sensor signal values of n redundant sensors in accordance with $dXij = Xi - Xj$ with: $i=1, \ldots, n-1, j=i+1, \ldots, n$ calculate mean values of the possible pairs of sensor signal values in accordance with $$Xij = \frac{Xi + Xj}{2}$$

with: $i = 1 \ldots n-1, j = i+1 \ldots n$ calculate weighting factors Gij for the possible pairs in accordance with $$Gij = \begin{cases} dsml - |dXij|, & \text{if } dsml - |dXij| > 0 \\ 0, & \text{else} \end{cases}$$

with: $i = 1 \ldots n-1, j = i+1 \ldots n$ and
determine the output signal value Y in accordance with $$Y = \frac{\sum_{i=1}^{n-1} \sum_{j=i+1}^{n} Xij \cdot Gij}{\sum_{i=1}^{n-1} \sum_{j=i+1}^{n} Gij}$$

8. The device as claimed in claim 1, wherein the computing device is configured to:
calculate absolute magnitudes dXij of sensor signal values of n redundant sensors in accordance with $dXij = Xi - Xj$ with: $i=1, \ldots, n-1, j=i+1, \ldots, n$ calculate mean values of the possible pairs of sensor signal values in accordance with $$Xij = \frac{Xi + Xj}{2}$$

with: $i = 1 \ldots n-1, j = i+1 \ldots n$ calculate weighting factors Gij for the possible pairs in accordance with $$Gij = \begin{cases} \sqrt{dsml - |dXij|}, & \text{if } dsml - |dXij| > 0 \\ 0, & \text{else} \end{cases}$$

with: $i = 1 \ldots n-1, j = i+1 \ldots n$ and
determine the output signal value Y in accordance with $$Y = \frac{\sum_{i=1}^{n-1} \sum_{j=i+1}^{n} Xij \cdot Gij}{\sum_{i=1}^{n-1} \sum_{j=i+1}^{n} Gij}$$

9. A sensor system, comprising:
at least three redundant sensors that are designed to output sensor signal values; and
a device as claimed in claim 1 that is designed to generate the output signal making use of the sensor signal values.

10. The sensor system as claimed in claim 9, wherein the sensors and the device are integrated into a circuit.

11. The sensor system as claimed in claim 9, wherein the sensors are integrated into a sensor circuit and the device is implemented in an external microcontroller.

12. The device as claimed in claim 1, wherein the output signal value is generated based on the sensor signal values associated with at least three redundant sensors.

13. A device for generating an output signal value making use of sensor signal values of at least three redundant sensors, the device comprising:
a computing device that is configured to:
ascertain for each signal value a deviation between the sensor signal value and a mean value of all the other sensor signal values;
determine the sensor signal value for which the largest deviation was ascertained;
determine the output signal value, wherein the sensor signal value for which the largest deviation has been ascertained is not taken into consideration in the determination of the output signal value;
perform, based on the determined output signal value, at least one of a fault-tolerant acquisition or fault correction of at least three redundant sensor channels associated with the at least three redundant sensors; and
generate an output signal based on performing at least one of the fault-tolerant acquisition or the fault correction.

14. The device as claimed in claim 13, wherein the computing device is configured to:
calculate deviations dXi in accordance with $$dXi = Xi - \frac{\sum_{j=1, j \neq i}^{n} Xj}{n - 1}$$

with: $i = 1 \ldots n$ calculate a maximum indicator UXi for each sensor signal value i in accordance with $$UXi = \begin{cases} 1, & \text{else} \\ 0, & \text{if } dXi = \max(dX1 \ldots dXn) \end{cases}$$

with: $i = 1 \ldots n$ and determine the output signal value Y in accordance with $$Y = \frac{\sum_{k=1}^{n} Xi \cdot UXi}{\sum_{k=1}^{n} UXi}$$

15. A method for generating an output signal value making use of sensor signal values of at least three redundant sensors, comprising:
  calculating mean values of possible pairs of sensor signal values, so that an associated absolute magnitude and an associated mean value are calculated for each pair of the possible pairs;
  determining an associated weighting factor for each pair, of the possible pairs, that depends on a distance of the associated absolute magnitude from a threshold value;
  determining, based on the calculated means value and the determined weighting factors, contributions of channels associated with the at least three redundant sensors;
  determining the output signal value based on a proportional channel accumulation using the determined contributions of channels;
  performing, based on the determined output signal value, at least one of a fault-tolerant acquisition or fault correction of at least three redundant sensor channels associated with the at least three redundant sensors; and
  generating an output signal based on performing at least one of the fault-tolerant acquisition or the fault correction.

16. The method as claimed in claim 15, further comprising:
  comparing each calculated absolute magnitude with a threshold value;
  checking for each sensor signal value whether all of the absolute magnitudes calculated making use of the sensor signal exceed the threshold value;
  marking the sensor signal value as valid if not all the absolute magnitudes calculated making use of the sensor signal value exceed the threshold value;
  marking the sensor signal value as invalid if all the absolute magnitudes calculated making use of this sensor signal value exceed the threshold value; and
  determining the output signal value making use of the sensor signal values that are marked as valid, wherein sensor signal values that are marked as invalid are not taken into consideration.

17. The method as claimed in claim 16, wherein the output signal value is determined as a mean value of all the sensor signal values that have been marked as valid.

18. The method as claimed in claim 15, further comprising:
  comparing the calculated absolute magnitudes with a threshold value;
  calculating values of the possible pairs of sensor signal values; and
  taking mean values of pairs of sensor signal values whose absolute magnitude does not exceed the threshold value into consideration when determining the output signal value, and not taking mean values of pairs of sensor signal values whose absolute magnitude exceeds the threshold value into consideration when determining the output signal value.

19. A computer program product with instructions which, when they are executed on a computer, carry out a method according to claim 15.

20. The method of claim 15, wherein the output signal value is generated based on the sensor signal values associated with at least three redundant sensors.

21. A method for generating an output signal value making use of sensor signal values of at least three redundant sensors, the method comprising:
  ascertaining for each signal value a deviation between a respective sensor signal value and a mean value of all the other sensor signal values;
  determining a sensor signal value, of the sensor signal values, for which the largest deviation was ascertained;
  determining the output signal value, wherein the sensor signal value for which the largest deviation has been ascertained is not taken into consideration in the determination of the output signal value;
  performing, based on the determined output signal value, at least one of a fault-tolerant acquisition or fault correction of at least three redundant sensor channels associated with the at least three redundant sensors; and
  generating an output signal based on performing at least one of the fault-tolerant acquisition or the fault correction.

* * * * *